(12) United States Patent
Sato et al.

(10) Patent No.: US 7,757,545 B2
(45) Date of Patent: Jul. 20, 2010

(54) DEVICE AND METHOD FOR DETERMINING TROUBLE OF CYLINDER PRESSURE SENSOR

(75) Inventors: Masahiro Sato, Saitama (JP); Katsura Okubo, Saitama (JP); Koichiro Shinozaki, Saitama (JP); Yuji Yasui, Saitama (JP); Keiichi Nagashima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 465 days.

(21) Appl. No.: 11/597,037

(22) PCT Filed: May 18, 2005

(86) PCT No.: PCT/JP2005/009102

§ 371 (c)(1),
(2), (4) Date: Jan. 24, 2008

(87) PCT Pub. No.: WO2005/113969

PCT Pub. Date: Dec. 1, 2005

(65) Prior Publication Data

US 2008/0236264 A1      Oct. 2, 2008

(30) Foreign Application Priority Data

May 20, 2004   (JP) ............................... 2004-150435

(51) Int. Cl.
*G06F 19/00*   (2006.01)
(52) U.S. Cl. .................................. 73/114.16; 73/114.18

(58) Field of Classification Search .............. 73/114.16, 73/114.18
See application file for complete search history.

(56) References Cited

U.S. PATENT DOCUMENTS 5,168,854 A * 12/1992 Hashimoto et al. ..... 123/406.17
5,617,337 A *  4/1997 Eidler et al. ................ 702/104

(Continued)

FOREIGN PATENT DOCUMENTS

JP         05-071396 A       3/1993

(Continued)

*Primary Examiner*—Lisa M Caputo
*Assistant Examiner*—Freddie Kirkland, III
(74) *Attorney, Agent, or Firm*—Arent Fox LLP

(57) ABSTRACT

A device and a method for determining the trouble of a cylinder pressure sensor without increasing cost calculates the cylinder pressure of an internal combustion engine based on an output from the cylinder sensor installed in the engine and calculates a drift parameter indicating the drift amount of the cylinder pressure based on the cylinder pressure. When the drift parameter is not within a specified range, the device determines that the cylinder pressure sensor is defective. The specified range can be set based on the behavior of the cylinder pressure. A correction factor is obtained according to the operating state of the engine, and the drift parameter is corrected with the correction factor. A specified search signal is superimposed on the output from the cylinder pressure sensor. The cylinder pressure is calculated based on the output from the cylinder pressure sensor on which the search signal was superimposed.

10 Claims, 28 Drawing Sheets

U.S. PATENT DOCUMENTS

| | | | | |
|---|---|---|---|---|
| 5,692,474 A | * | 12/1997 | Yamauchi et al. | 123/406.22 |
| 7,073,485 B2 | * | 7/2006 | Truscott et al. | 123/406.22 |
| 7,117,725 B2 | * | 10/2006 | Okubo et al. | 73/114.21 |
| 7,212,912 B2 | * | 5/2007 | Okubo et al. | 701/114 |
| 7,278,303 B2 | * | 10/2007 | Piewek et al. | 73/114.16 |
| 7,542,865 B2 | * | 6/2009 | Hoshi et al. | 702/106 |
| 2003/0188714 A1 | * | 10/2003 | Yamamoto et al. | 123/435 |

FOREIGN PATENT DOCUMENTS

| | | | |
|---|---|---|---|
| JP | 6-201501 A | | 7/1994 |
| JP | 07-280686 | * | 10/1995 |
| JP | 7-280686 A | | 10/1995 |
| JP | 7-310585 A | | 11/1995 |
| JP | 07-317592 A | | 12/1995 |
| JP | 7-318458 A | | 12/1995 |
| JP | 2003-90851 A | | 3/2003 |
| WO | WO 02/095191 | * | 11/2002 |

* cited by examiner

DEVICE AND METHOD FOR DETERMINING TROUBLE OF CYLINDER PRESSURE SENSOR

CROSS-REFERENCE TO RELATED APPLICATION

This application is a National Stage entry of International Application No. PCT/JP2005/009102, filed May 18, 2005, the entire specification claims and drawings of which are incorporated herewith by reference.

TECHNICAL FIELD

The present invention relates to an apparatus and a method for determining a failure of a sensor that detects an internal cylinder pressure of an internal combustion engine.

Conventionally, an in-cylinder pressure sensor is provided in a cylinder of an engine so as to detect a pressure within the cylinder (this pressure is referred to as an in-cylinder pressure hereinafter). The in-cylinder pressure detected by the sensor is used in various controls for the engine.

Some techniques have been proposed for detecting a failure of the in-cylinder pressure sensor. According to the following Patent Application Publication 1, a predicted value of an in-cylinder pressure detected by the in-cylinder pressure sensor when combustion is normal is calculated based on the operating condition of an engine. Then, a difference is calculated between the predicted value and an actually-measured value that is detected by the in-cylinder pressure sensor. When the difference is larger than a predetermined value, it is determined that the in-cylinder pressure sensor is faulty.

According to the following Patent Application Publication 2, a sensor is provided for detecting the intensity of combustion light. Then, a correlation value between the combustion light intensity detected by the sensor and a value detected by the in-cylinder pressure sensor is calculated. When the correlation value is equal to or smaller than a predetermined value, it is determined that the in-cylinder pressure sensor is faulty.

DISCLOSURE OF THE INVENTION

Problems to be Solved by the Invention

It is difficult to determine a predicted value of the in-cylinder pressure for all operating conditions of the engine. If the predicted value is not appropriately established, a failure of the in-cylinder pressure sensor cannot be accurately detected.

A sensor for detecting the combustion light intensity is expensive. The layout of some engines makes it difficult to install such a sensor.

Thus, there is a need for a technique for more accurately detecting a failure of the in-cylinder pressure sensor without increasing cost and changing the layout of existing engines.

Means for Solving Problem

According to one aspect of the present invention, an apparatus for determining a failure of an in-cylinder pressure sensor determines an in-cylinder pressure of an internal combustion engine based on an output of the in-cylinder pressure sensor provided in the engine and then determines a drift parameter indicating the amount of drift included in the in-cylinder pressure based on the determined in-cylinder pressure. It is determined that the in-cylinder pressure sensor is faulty if the drift parameter is not within a predetermined range. In one embodiment, the predetermined range may be established based on a behavior of the in-cylinder pressure.

According to one embodiment of the invention, a correction coefficient for correcting the drift parameter according to an operating condition of the engine is determined. The drift parameter is corrected with the correction coefficient. It is determined that the in-cylinder pressure sensor is faulty if the corrected drift parameter is not within the predetermined range.

According to another embodiment of the invention, the apparatus for determining a failure of the in-cylinder pressure further includes means for manipulating the in-cylinder pressure sensor such that a predetermined signal (search signal) is superimposed on the output of the in-cylinder pressure sensor. The in-cylinder pressure is determined based on the output of the in-cylinder pressure sensor on which the predetermined signal has been superimposed.

According to another embodiment of the invention, an apparatus for determining a failure of any of cylinder pressure sensors provided in respective cylinders of an internal combustion engine is provided. For each cylinder, an in-cylinder pressure is determined based on an output of the in-cylinder pressure sensor and a drift parameter indicating the amount of drift included in the in-cylinder pressure is determined based on the determined in-cylinder pressure. The apparatus further determines a correlation among the drift parameters for the cylinders and then determines whether any of the in-cylinder pressure sensors is faulty based on the correlation.

As to determining the above-described drift parameter, some embodiments are provided. According to one embodiment, reset means is provided for resetting the in-cylinder pressure to a reference value at a predetermined timing. The drift parameter is determined based on a difference between the in-cylinder pressure determined before the reset operation and the in-cylinder pressure determined after that reset operation.

According to another embodiment, the apparatus for determining a failure of the in-cylinder pressure sensor further includes in-cylinder pressure correcting means for correcting the in-cylinder pressure such that the in-cylinder pressure contains no drift. The in-cylinder pressure correcting means further includes correction means for correcting the output of the in-cylinder pressure sensor, integral means for integrating the output of the correction means to determine the in-cylinder pressure, and drift change rate calculating means for calculating a rate of change of drift contained in the in-cylinder pressure based on the in-cylinder pressure. The in-cylinder pressure correcting means feeds back the calculated drift change rate to the correction means. The correction means corrects the output of the in-cylinder pressure sensor with the drift change rate. The drift parameter is determined based on the drift change rate.

According to another embodiment, the apparatus for determining a failure of the in-cylinder pressure sensor further includes means for correcting the in-cylinder pressure with a drift correction amount that removes drift from the in-cylinder pressure. The drift parameter is determined based on the drift correction amount.

EFFECTIVE OF THE INVENTION

According to the invention, a failure of the in-cylinder pressure sensor can be detected based on the drift contained in the in-cylinder pressure. Because prediction of the in-cylinder pressure is not required, a failure can be detected with high accuracy. Because installation of an additional sensor is not required, a failure can be detected without increasing cost.

EXPLANATIONS OF LETTERS OR NUMERALS

1 ECU
2 Engine
8 Combustion chamber
15 In-cylinder pressure sensor

BEST MODE FOR CARRYING OUT THE INVENTION

Figure 1:
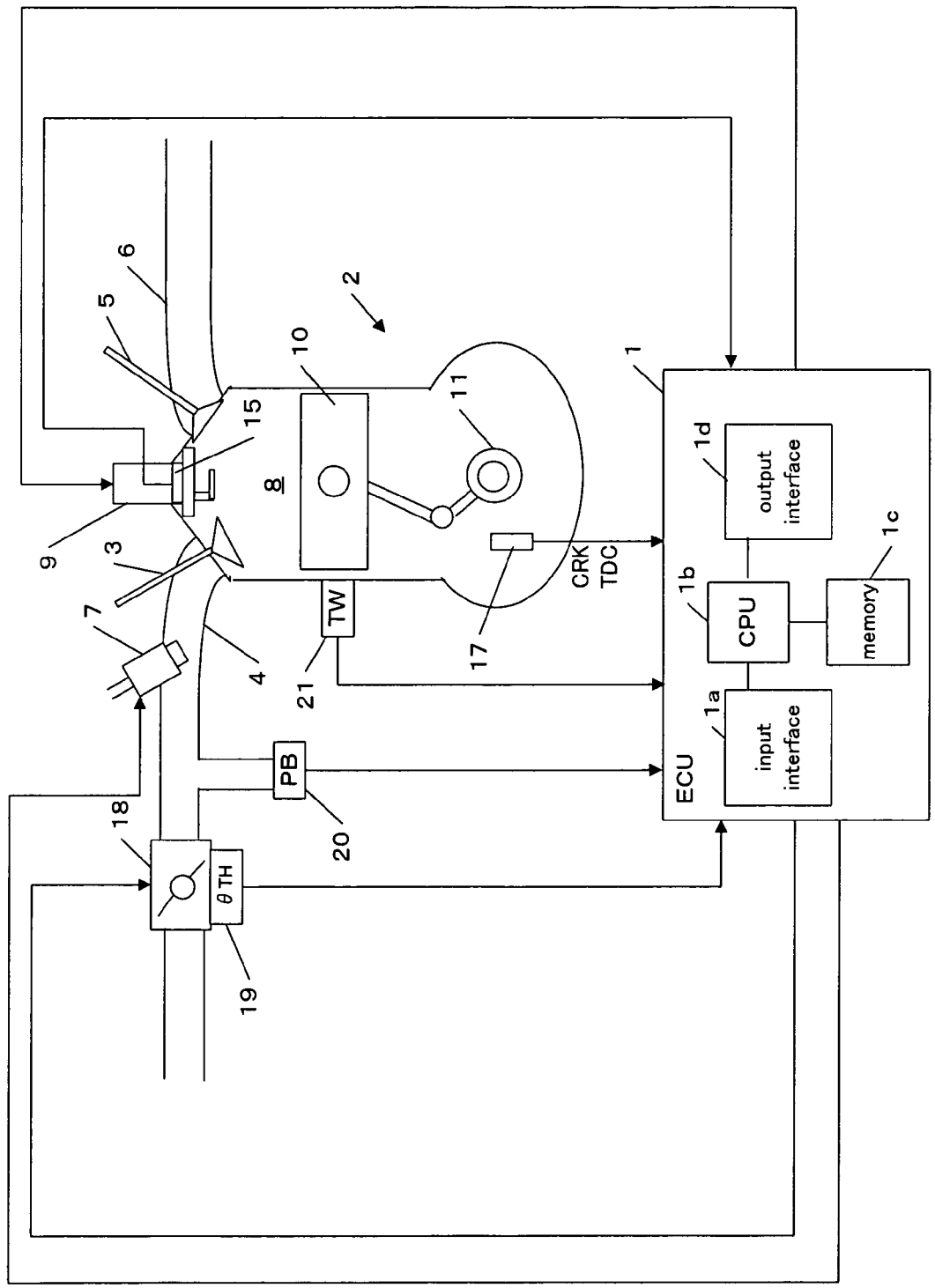
FIG. 1 A figure schematically showing an engine and its control unit in accordance with one embodiment of the present invention.

Preferred embodiments will be now described referring to the drawings. FIG. 1 shows an overall structure of an internal-combustion engine (hereinafter referred to as an engine) and its control unit in accordance with one embodiment of the present invention.

An electronic control unit (hereinafter referred to as an "ECU") 1 includes an input interface 1a for receiving data sent from each section of a vehicle, a CPU 1b for performing computation so as to control each section of the vehicle, a memory 1c having a Read-Only Memory (ROM) and a Random Access Memory (RAM), and an output interface 1d for sending a control signal to each section of the vehicle. The ROM of the memory 1c stores one or more programs and data required for controlling each section of the vehicle. One or more programs for detecting a failure of an in-cylinder pressure sensor according to the present invention are stored in the ROM. The ROM may be a rewritable ROM such as an EPROM. The RAM provides work areas for operation by the CPU 1b. Data and control signals received from each section of the vehicle and sent to each section of the vehicle are temporarily stored in the RAM.

The engine 2 is, for example, a 4-cylinder, 4-cycle engine. One of the cylinders is shown in the figure. The engine 2 may comprise a variable compression ratio mechanism.

The engine 2 is connected to an intake manifold 4 through an intake valve 3 and connected to an exhaust manifold 6 through an exhaust valve 5. The intake valve 3 and the exhaust valve 5 may be a continuously variable valve-driving system. A fuel injection valve 7 for injecting fuel in accordance with a control signal from the ECU 1 is disposed in the intake manifold 4. Alternatively, the fuel injection valve 7 may be provided in a combustion chamber 8.

The engine 2 takes mixture of air taken from the intake manifold 4 and fuel injected from the fuel injection valve 7 into the combustion chamber 8. A spark plug 9 is provided in the combustion chamber 8 to ignite a spark in accordance with an ignition timing signal from the ECU 1. The air-fuel mixture is burned by the spark ignited by the spark plug 9.

An in-cylinder pressure sensor 15 is embedded in a portion of the spark plug 9 that contacts the cylinder. Alternatively, in the case where the fuel injection valve 7 is provided in the combustion chamber 8, the in-cylinder pressure sensor 15 may be embedded in a portion of the fuel injection valve 7 that contacts the cylinder. The in-cylinder pressure sensor 15 generates a signal corresponding to a rate of change of an internal cylinder pressure within the combustion chamber 8 and sends the generated signal to the ECU 1.

A crank angle sensor 17 is disposed in the engine 2. The crank angle sensor 17 outputs a CRK signal and a TDC signal, which are pulse signals, to the ECU 1 in accordance with the rotation of a crankshaft 11.

The CRK signal is a pulse signal that is output at every predetermined crank angle. The ECU 1 calculates a rotational speed NE of the engine 2 in accordance with the CRK signal. The TDC signal is also a pulse signal that is output at a crank angle associated with the TDC position of a piston 10.

A throttle valve 18 is disposed in an intake manifold 4 of the engine 2. An opening degree of the throttle valve 18 is controlled by a control signal from the ECU 1. A throttle valve opening sensor (θTH) 19, which is connected to the throttle valve 18, provides the ECU 1 with a signal indicating the opening degree of the throttle valve 18.

An intake manifold pressure (Pb) sensor 20 is disposed downstream of the throttle valve 18. The intake manifold pressure Pb detected by the Pb sensor 20 is sent to the ECU 1.

An engine water temperature (TW) sensor 21 is attached to a cylinder peripheral wall (not shown), which is filled with cooling water, of a cylinder block of the engine 2. A temperature of the engine cooling water detected by the TW sensor 21 is sent to the ECU 1.

A signal sent to the ECU 1 is passed to the input interface 1a. The input interface 1a converts an analog signal value into a digital signal value (A/D conversion). The CPU 1b processes the resulting digital signal in accordance with a program stored in the memory 1c, and creates a control signal. The output interface 1d sends the control signal to actuators for the fuel injection valve 7, spark plug 9, throttle valve 18, and other mechanical components.

Figure 2:
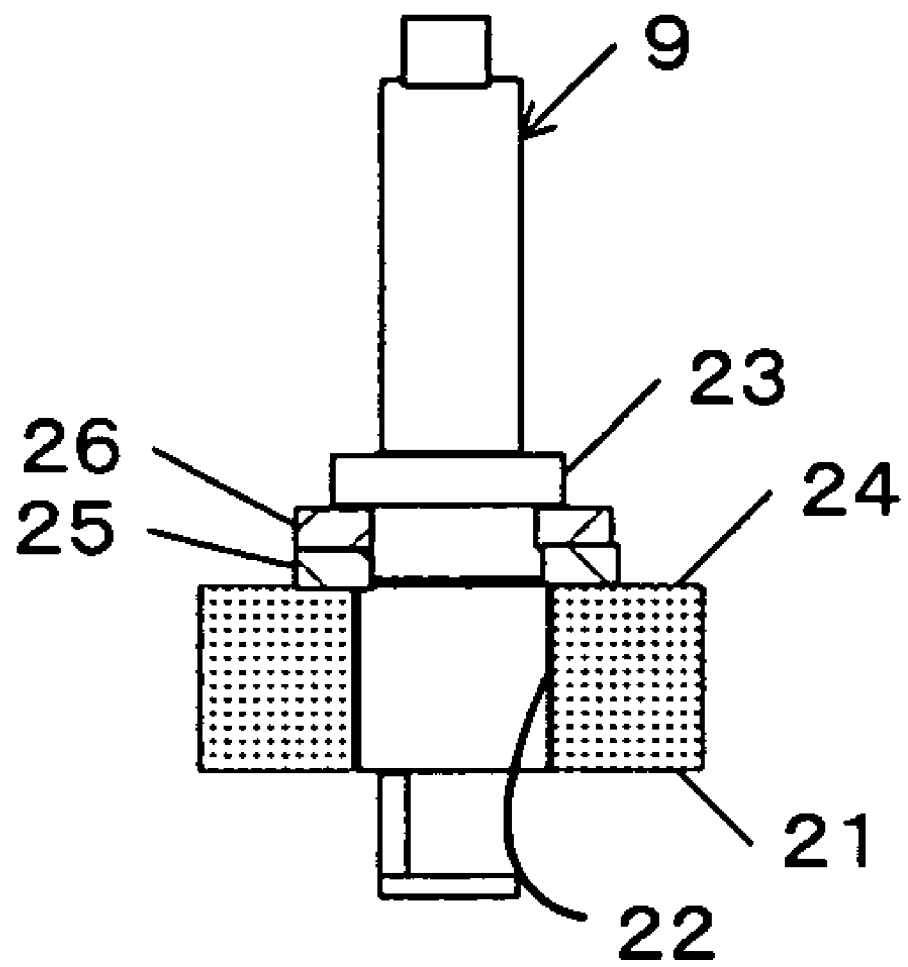
FIG. 2 A figure showing the mounting of an in-cylinder pressure sensor in accordance with one embodiment of the present invention.

FIG. 2 shows an example of mounting of the in-cylinder pressure sensor 15. The spark plug 9 is screwed in a screw hole 22 of a cylinder head 21. A sensor element 25 of the in-cylinder pressure sensor and a washer 26 are sandwiched between a spark plug attaching surface 23 and a spark plug washer surface 24 of the cylinder head 21. The sensor element 25 is a piezo-electric element.

Since the sensor element 25 is tightened as a washer of the spark plug 9, the sensor element 25 is given a predetermined tightening load (initial load). As the pressure within the combustion chamber 8 changes, the load applied to the sensor element 25 changes. The in-cylinder pressure sensor 15 detects a change of the load relative to the predetermined tightening load as a change in the in-cylinder pressure. The in-cylinder pressure is determined by integrating the change in the in-cylinder pressure.

In general, when the piezo-electric element is used, there exist the hysteresis characteristics between a change in the internal cylinder pressure and an output of the in-cylinder pressure sensor. Further, the output of the in-cylinder pressure sensor increases with an increase of a temperature of the piezo-electric element. If such an in-cylinder pressure sensor is mounted on the engine, variations occur in the output of the in-cylinder pressure sensor depending on the heat generated by the engine. As a result, a "deviation" or "drift" may occur in the waveform of the in-cylinder pressure determined by the integration.

Figure 3:
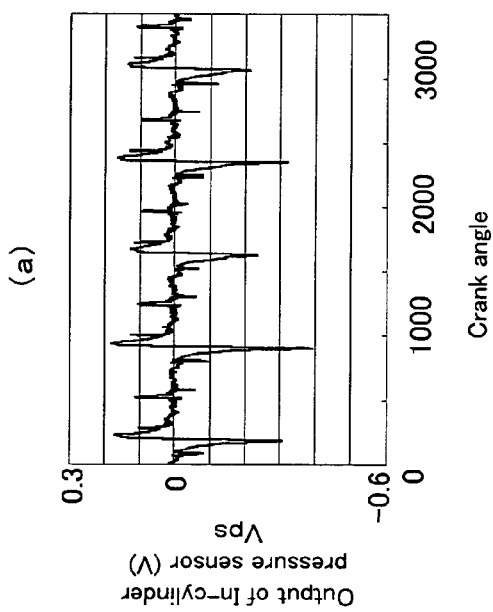
FIG. 3 A figure showing (a) a waveform of an output of an in-cylinder pressure sensor, (b) a waveform of an in-cylinder pressure containing no drift, and (c) a waveform of an in-cylinder pressure containing a drift, in accordance with one embodiment of the present invention.
Figure 3:
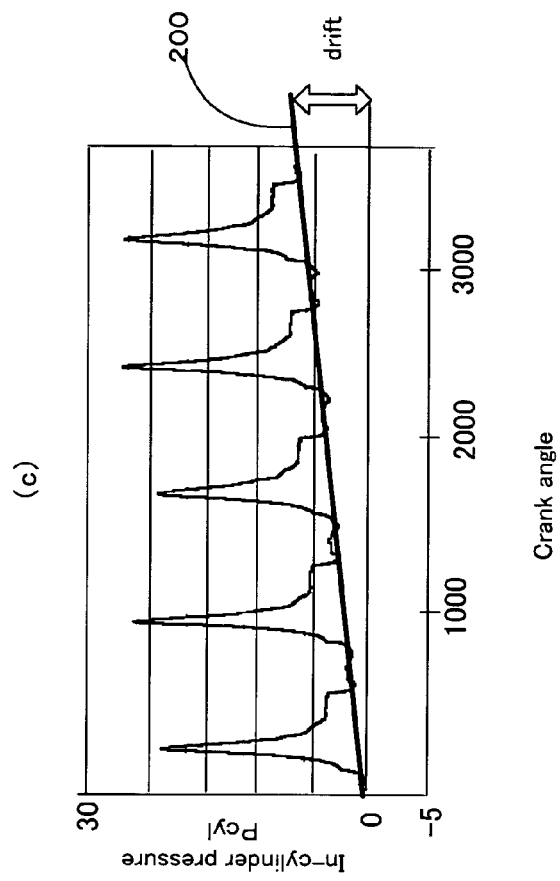
Figure 3:
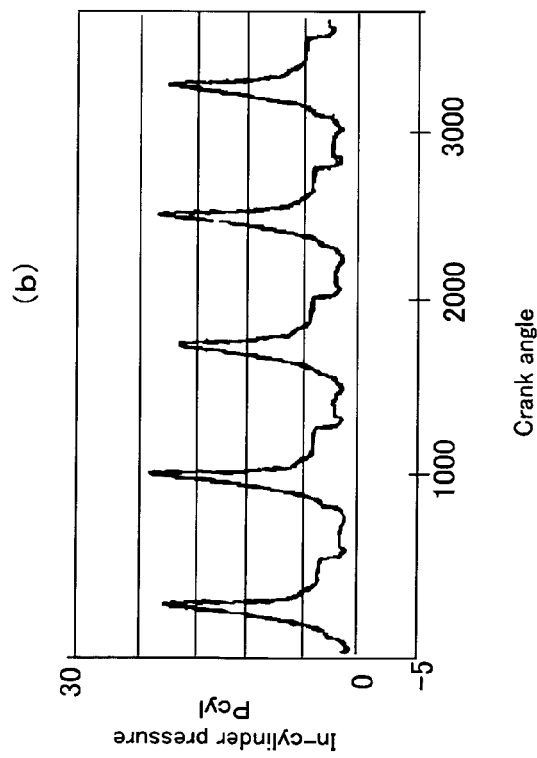

As an example, an output of the in-cylinder pressure sensor 15, which indicates a rate of change Vps of the in-cylinder pressure, is shown in FIG. 3(a).

In order to calculate the in-cylinder pressure, the output Vps of the in-cylinder pressure is integrated as shown by the equation (1).

$$Pcyl = \int Vps \tag{1}$$

FIGS. 3(b) and 3(c) show the waveforms of the in-cylinder pressure Pcyl obtained by the integration. FIG. 3(b) is an example of the in-cylinder pressure Pcyl in which no drift appears. FIG. 3(c) is an example of the in-cylinder pressure Pcyl in which a drift appears as indicated by a line 200.

It was found that the magnitude of such a drift changes depending on not only the temperature but also the degree of deterioration of the in-cylinder pressure sensor. The magnitude of the drift is larger as the degree of deterioration of the in-cylinder pressure sensor is larger. The inventors of the present invention propose some techniques for detecting a failure of the in-cylinder pressure sensor based on these findings.

Embodiment 1

Figure 4:
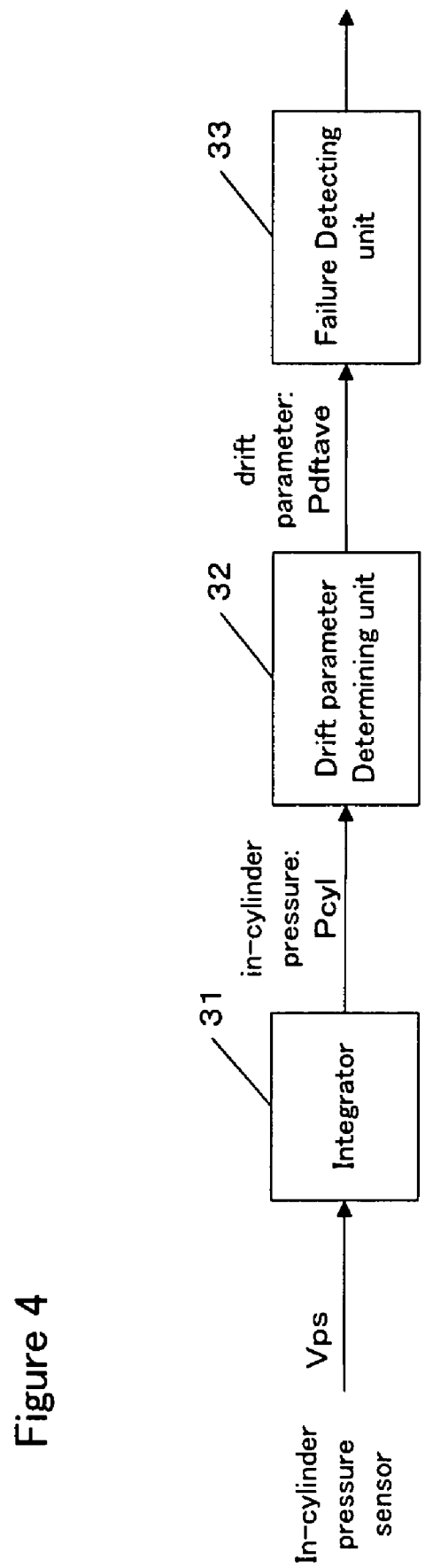
FIG. 4 A block diagram of an apparatus for determining a failure in accordance with a first embodiment of the present invention.

FIG. 4 is a block diagram of an apparatus for determining a failure of the in-cylinder pressure sensor in accordance with a first embodiment of the present invention. The functions of the blocks are implemented in the ECU 1. Typically, these functions are implemented by one or more computer programs stored in the ECU 1. Alternatively, these functions may be implemented by hardware, firmware, software or any combination thereof (the same is applicable to the block diagrams hereinafter described).

The output of the cylinder pressure sensor 15 is converted from analog to digital and then is input, as Vps, into an apparatus for detecting a failure of the in-cylinder pressure sensor. This analog-to-digital conversion is performed at a time interval Tk that is shorter than one combustion cycle. An integrator 31 integrates the output of the in-cylinder pressure sensor 15 in accordance with the above equation (1) to determine the in-cylinder pressure Pcyl. This integration is preferably performed in synchronization with the time period Tk at which the analog/digital conversion for the output of the in-cylinder pressure sensor is performed.

A drift parameter determining unit 32 determines a drift parameter that represents the magnitude of drift included in the in-cylinder pressure during one combustion cycle. In this embodiment, a value Pdftave that is determined by recursively applying a statistical process to the amount of drift Pdft of the in-cylinder pressure during one combustion cycle is used as the drift parameter. Based on the drift parameter Pdftave, a failure detecting unit 33 determines whether or not the in-cylinder pressure sensor 15 is faulty.

Processes of the flowcharts described hereinafter are typically performed by the ECU 1.

Figure 5:
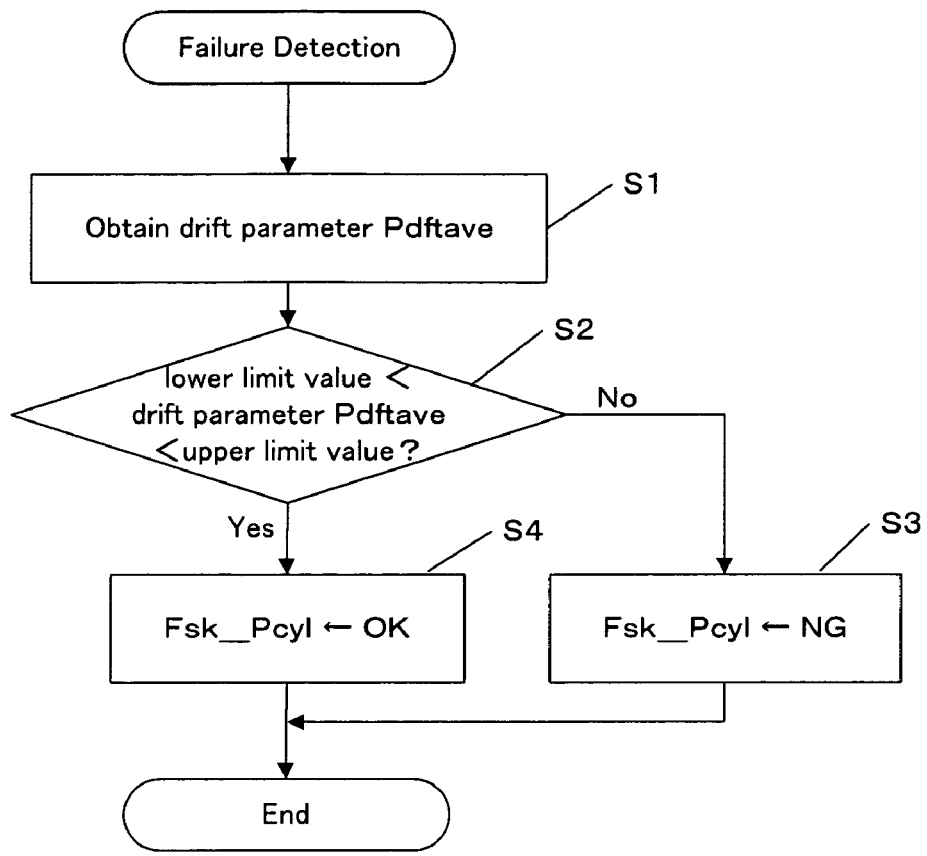
FIG. 5 A flowchart of a process for detecting a failure of the in-cylinder pressure sensor in accordance with the first embodiment of the present invention.

FIG. 5 is a flowchart of a process for detecting a failure of the in-cylinder pressure sensor in accordance with a first embodiment. This process is performed once in each combustion cycle. Preferably, this process is performed during the exhaust stroke where the in-cylinder pressure has decreased to and remains stable at around the atmospheric pressure. In one embodiment, one combustion cycle corresponds to 720 crank angle degrees.

In step S1, the drift parameter Pdftave is obtained from a routine (for example, FIG. 7) for determining the drift parameter of the in-cylinder pressure. In step S2, it is determined whether or not the drift parameter Pdftave is within a predetermined range that is defined by an upper limit value (for example, 2 mV) and a lower limit value (for example, −2 mV). If the drift parameter Pdftave is not within the range, it is determined that there is a probability that the in-cylinder pressure sensor is faulty and then NG is set in a flag Fsk_Pcyl (S3). If the drift parameter Pdftave is within the range, it is determined that the in-cylinder pressure sensor is normal and then OK is set in the flag Fsk_Pcyl (S4).

Figure 6:
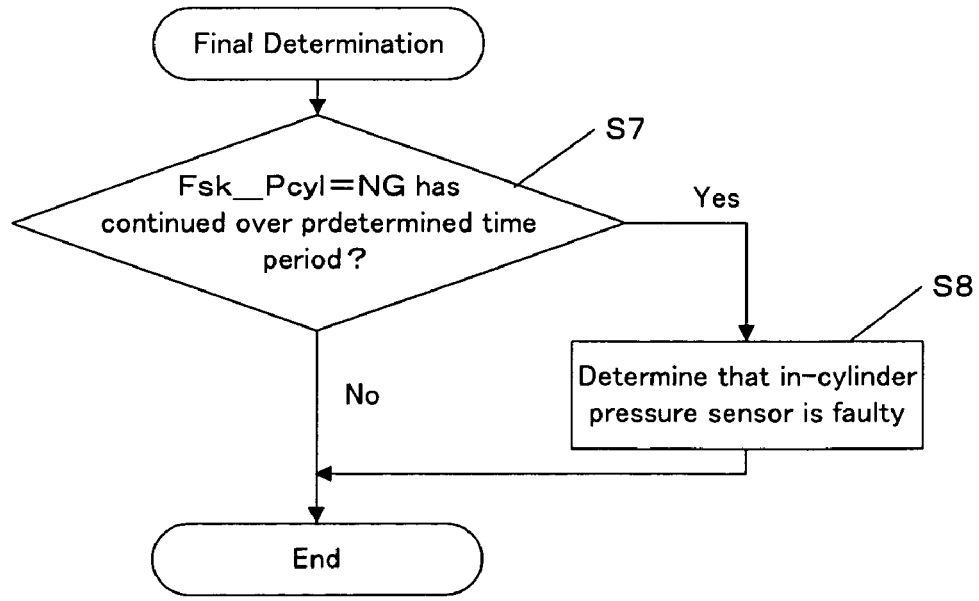
FIG. 6 A flowchart of a process for finally determining a failure of the in-cylinder pressure sensor in accordance with the first embodiment of the present invention.

FIG. 6 is a flowchart of a process for finally determining whether the in-cylinder pressure sensor is faulty. This process is performed at a predetermined time interval (for example, ten milliseconds).

In step S7, it is determined whether or not the setting of the value NG in the flag Fsk_Pcyl has continued over predetermined time period (for example, 500 milliseconds). If the decision of step S7 is Yes, it is determined that the in-cylinder pressure sensor is faulty (S8). Such determination allows a failure of the in-cylinder pressure sensor to be more accurately detected.

Alternatively, a failure of the in-cylinder pressure sensor may be determined in response to setting of NG in the flag Fsk_Pcyl in step S3 of FIG. 5.

Figure 7:
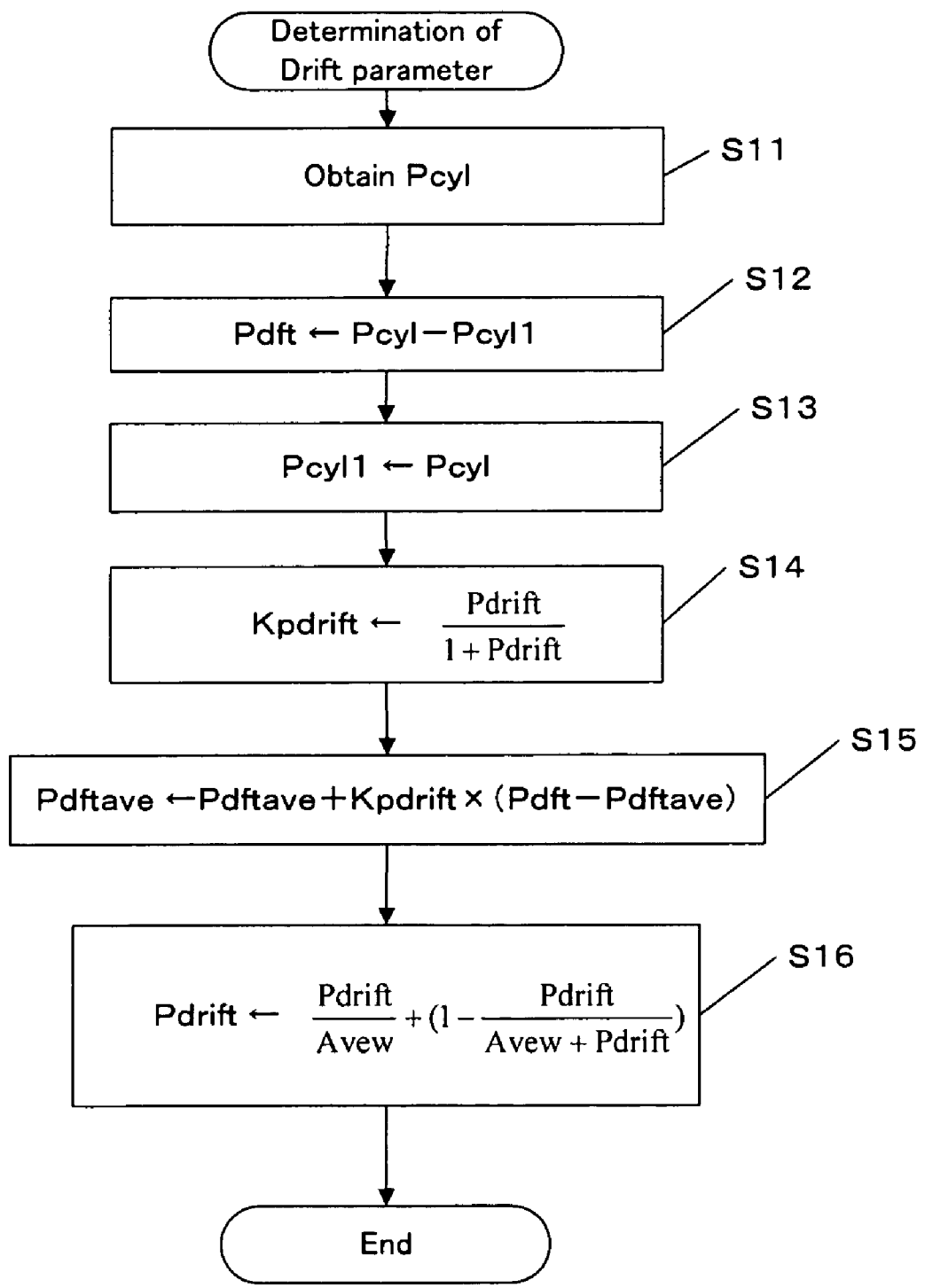
FIG. 7 A flowchart of a process for determining a drift parameter in accordance with the first embodiment of the present invention.

FIG. 7 is a flowchart of a process for determining the drift parameter. This process is performed once in each combustion cycle. Preferably, this process is performed during the exhaust stroke where the in-cylinder pressure has decreased to and remains stable at around the atmospheric pressure.

In step S11, the in-cylinder pressure Pcyl calculated by the integrator 31 is obtained. In step S12, a previous value Pcyl1 for the in-cylinder pressure is subtracted from the current value Pcyl for the in-cylinder pressure to determine a drift amount Pdft of the in-cylinder pressure. The drift amount Pdft indicates the amount of drift during one combustion cycle. As described above, since this process is performed during the exhaust stroke, the in-cylinder pressure Pcyl is sampled at a timing when the in-cylinder pressure Pcyl has surely decreased to and remains stable at around the atmospheric pressure. Therefore, the drift amount Pdft can be more accurately calculated. In step S13, the current value Pcyl for the in-cylinder pressure is shifted to the previous value Pcyl1.

In step S14, a coefficient Kpdrift is calculated in accordance with the equation (2). Pdrift represents a variable gain that is to be calculated in step S16, which will be described later. The initial value of Pdrift is zero.

$$K p\text{drift} = P\text{drift}/(1+P\text{drift}) \tag{2}$$

In step S15, Pdftave, which is a value obtained by statistically processing the drift amount, is calculated in accordance with the equation (3).

$$P\text{dftave} = P\text{dftave} + K p\text{drift} \times (P\text{dft} - P\text{dftave}) \tag{3}$$

Thus, the statistically-processed value Pdftave is recursively determined such that an error "Pdft−Pdftave" is minimized.

In step S16, the variable gain Pdrift is calculated in accordance with the equation (4). Here, Avew is a fixed weighting parameter (for example, 0.991).

$$P\text{drift} = P\text{drift}/A\text{vew} + (1 - P\text{drift}/(A\text{vew} + P\text{drift})) \tag{4}$$

Thus, the drift amount Pdft and the drift parameter (statistically processed value) Pdftave of the in-cylinder pressure are calculated for each combustion cycle.

Variations may occur in the output of the in-cylinder pressure sensor due to noise and operating condition of the engine. The influence caused by such variations on the failure determination can be minimized by using the recursively statistically-processed value Pdftave.

However, in an alternative embodiment, the failure determination may be performed by using the drift amount Pdft as the drift parameter. For example, when the drift amount Pdft is not within a predetermined range, NG is set in the flag Fsk_Pcyl.

Embodiment 2

Figure 8:
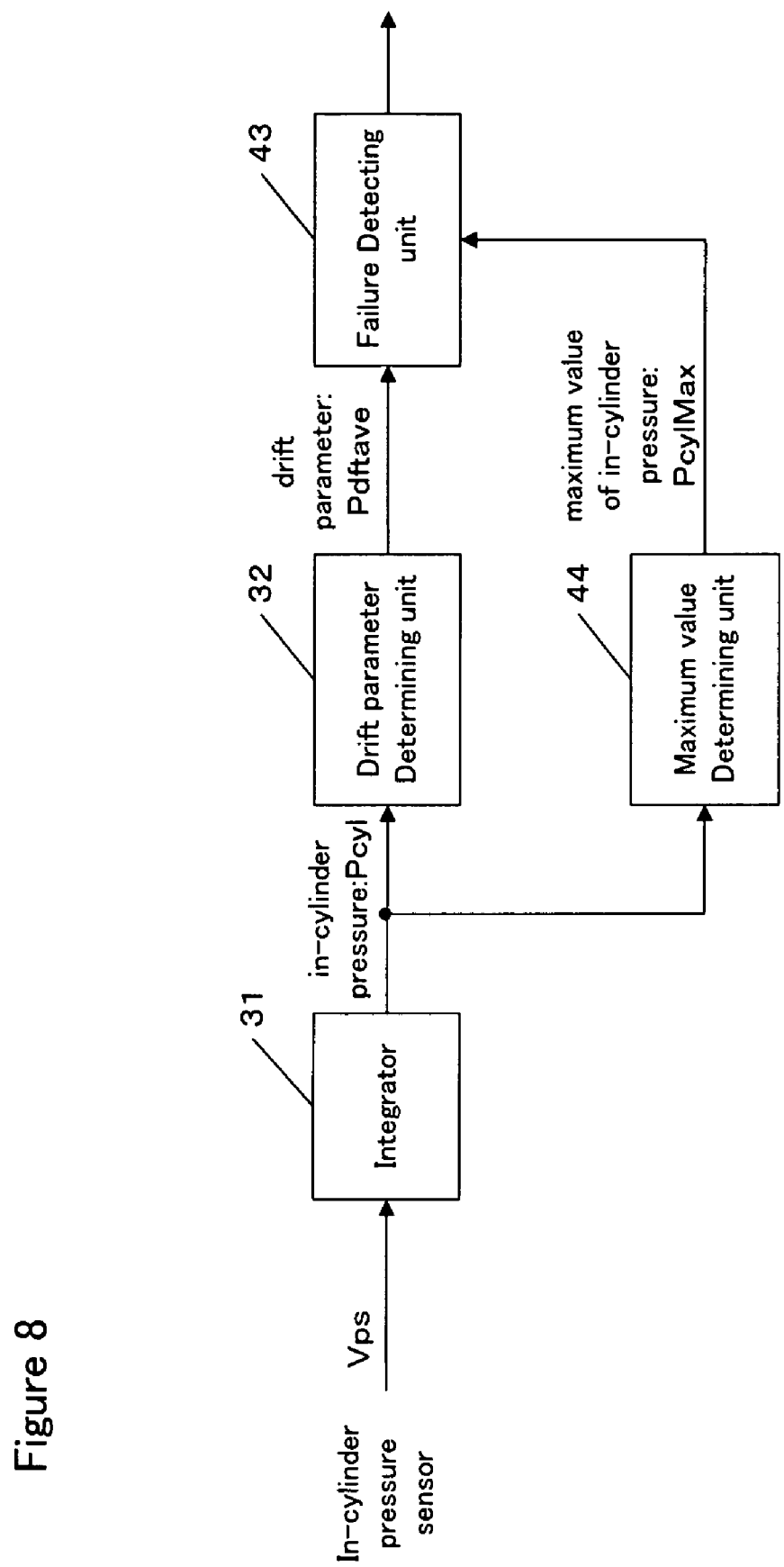
FIG. 8 A block diagram of an apparatus for determining a failure in accordance with a second embodiment of the present invention.

FIG. 8 is a block diagram of an apparatus for determining a failure of the in-cylinder pressure sensor in accordance with a second embodiment of the present invention. The second embodiment differs from the first embodiment in that a failure of the in-cylinder pressure sensor is detected considering not only the drift amount but also a behavior of the in-cylinder pressure.

The integrator 31 and the drift parameter determining unit 32 are the same as shown in FIG. 4 of the first embodiment. A maximum value determining unit 44 determines the maximum value PcylMax of the in-cylinder pressure Pcyl during one combustion cycle. Based on the maximum value Pcyl-Max of the in-cylinder pressure, a failure detecting unit 43 establishes a range to be used for determining a failure of the in-cylinder pressure sensor. The failure detecting unit 43 detects a failure of the in-cylinder pressure sensor in accordance with whether or not the drift parameter Pdftave is within the range thus established.

The amount of drift included in the in-cylinder pressure changes in accordance with the behavior of the in-cylinder pressure. According to the second embodiment, a failure of the in-cylinder pressure sensor can be more accurately detected because the range used for determining a failure of the in-cylinder pressure sensor is established in accordance with the behavior of the in-cylinder pressure.

Figure 9:
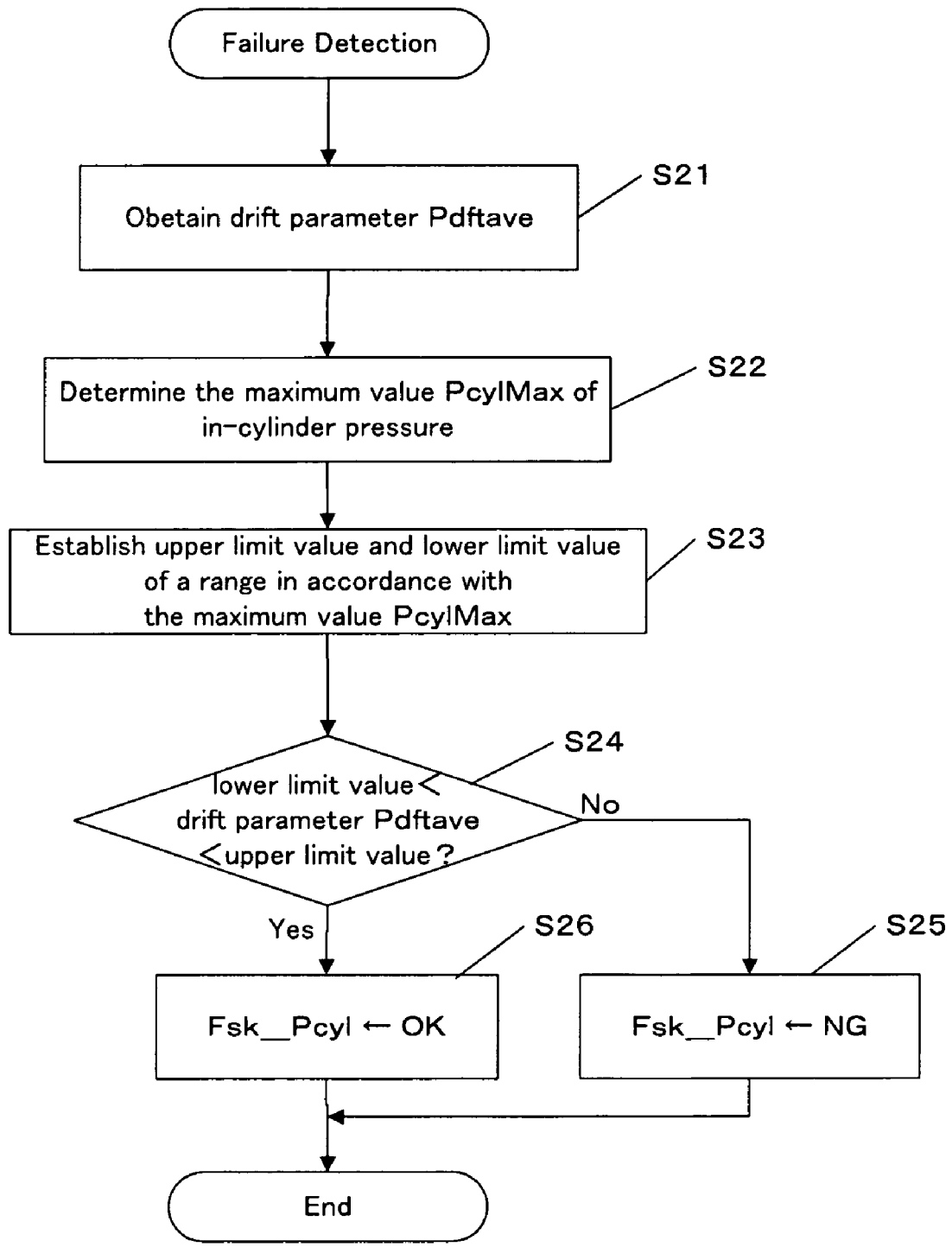
FIG. 9 A flowchart of a process for detecting a failure of the in-cylinder pressure sensor in accordance with the second embodiment of the present invention.

FIG. 9 shows a flowchart of a process for detecting a failure of the in-cylinder pressure sensor in accordance with the second embodiment. For example, this process is performed, preferably during the exhaust stroke, in each combustion cycle. In one embodiment, one combustion cycle corresponds to 720 crank angle degrees.

In step S21, the drift parameter Pdftave is obtained from a routine (for example, FIG. 7) for determining the drift parameter of the in-cylinder pressure. In step S22, the maximum value PcylMax of the in-cylinder pressure during the current combustion cycle is determined. In step S23, an upper limit value and a lower limit value of a range are established in accordance with the maximum value PcylMax of the in-cylinder pressure.

Figure 10:
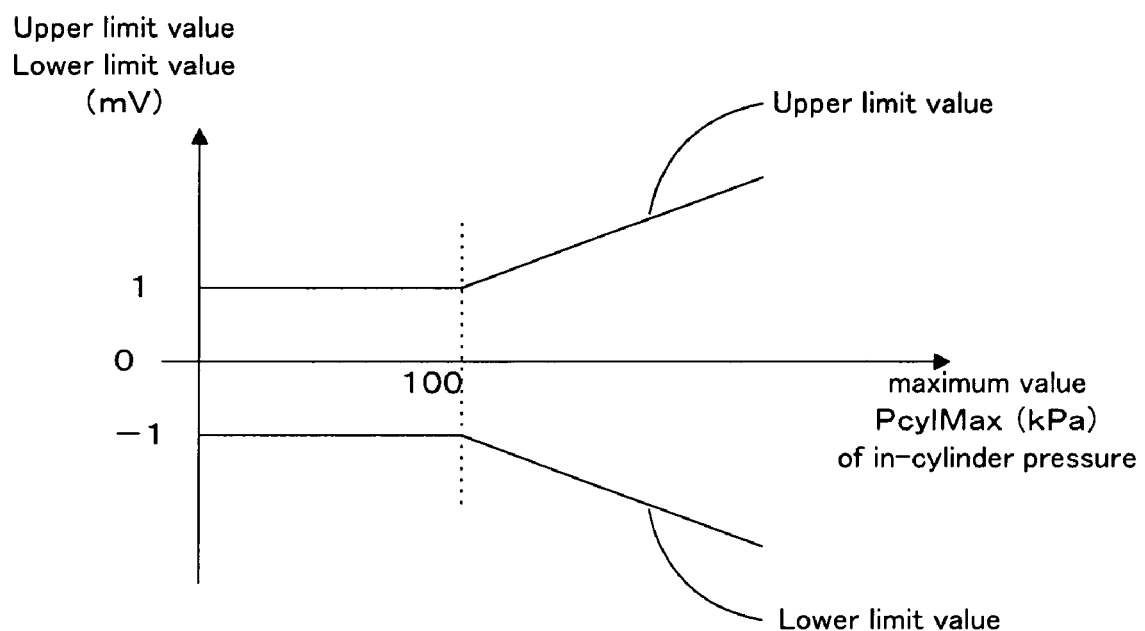
FIG. 10 A map for establishing a predetermined range to be used for detecting a failure of the in-cylinder pressure sensor in accordance with the second embodiment of the present invention.

FIG. 10 shows an example of establishing of the range. When the maximum value PcylMax of the in-cylinder pressure is smaller than 100 kPa, the upper limit value and the lower limit value are set to 1 mV and −1 mV, respectively.

When the maximum value PcylMax of the in-cylinder pressure is larger than 100 kPa, the upper limit value and the lower limit value are set such that their absolute values increase with increase of the maximum value PcylMax. This is because, when the in-cylinder pressure sensor is faulty, variations in the drift become larger with increase of variations in the in-cylinder pressure.

Referring back to FIG. 9, in step S24, it is determined whether or not the drift parameter Pdftave is within the range defined by the upper limit value and the lower limit value established in step S23. If the drift parameter Pdftave is not within the range, it is determined that there is a probability that the in-cylinder pressure sensor is faulty and then NG is set in a flag Fsk_Pcyl (S25). If the drift parameter Pdftave is within the range, it is determined that the in-cylinder pressure sensor is normal and then OK is set in the flag Fsk_Pcyl (S26).

The final failure determination process, which is shown in FIG. 6 in accordance with the first embodiment, is applicable to the second embodiment. Similarly to the first embodiment, the drift amount Pdft may be used as the drift parameter in place of the statistically-processed value Pdftave.

In the second embodiment, instead of the maximum value PcylMax of the in-cylinder pressure, another parameter representing the magnitude of variations in the in-cylinder pressure Pcyl may be used. For example, the indicated mean effective pressure may be used. The indicated mean effective pressure is a well known parameter in the art. The in-cylinder pressure changes depending on what stroke is being executed in the engine. After the intake stroke starts, the in-cylinder pressure decreases because the intake valve opens. During the compression stroke, the in-cylinder pressure increases. When air-fuel mixture burns, the in-cylinder pressure rapidly increases. The piston is pushed down and the in-cylinder pressure starts to decrease. After the exhaust stroke starts, the in-cylinder pressure further decreases because the exhaust valve opens. As shown in the equation (5), the indicated mean effective pressure can be typically calculated by dividing a value, which is obtained by integrating a change rate ΔPcyl of the in-cylinder pressure over one combustion cycle, by the total stroke volume V of the engine.

$$Pmi = \frac{\int (\Delta Pcyl) dv}{V} \quad (5)$$

Embodiment 3

Figure 11:
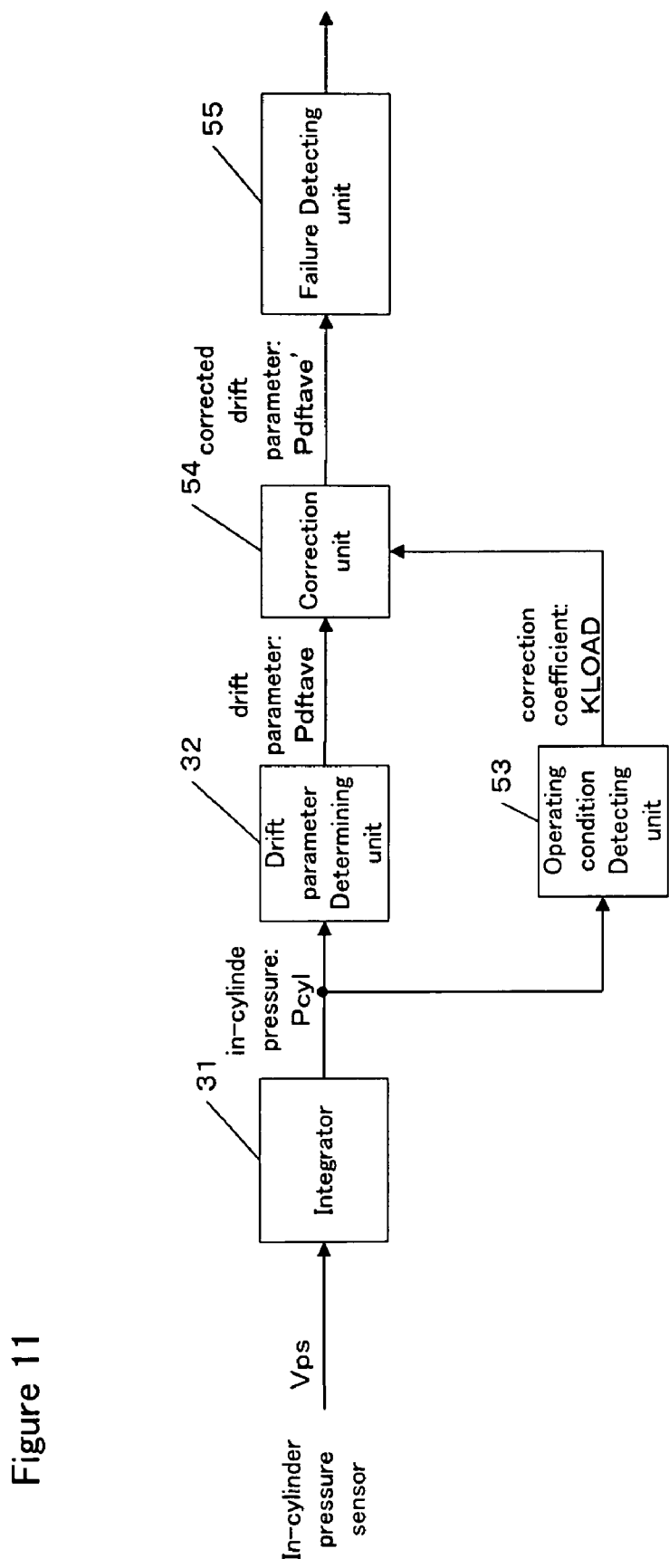
FIG. 11 A block diagram of an apparatus for determining a failure in accordance with a third embodiment of the present invention.

FIG. 11 is a block diagram of an apparatus for determining a failure of the in-cylinder pressure sensor in accordance with a third embodiment of the present invention.

The amount of drift included in the in-cylinder pressure may change depending on the operating condition of the engine. According to the third embodiment, a failure of the in-cylinder pressure sensor can be more accurately detected because the drift parameter is corrected in accordance with the operating condition of the engine so that the influence of the operating condition on the drift parameter is suppressed.

The integrator 31 and the drift parameter determining unit 32 are the same as shown in FIG. 4 of the first embodiment. An operating condition detecting unit 53 calculates a correction coefficient KLOAD based on the intake manifold pressure PB that is detected by the intake manifold pressure sensor 20 (FIG. 1). The intake manifold pressure PB represents the load of the engine.

A correction unit 54 corrects the drift parameter Pdftave with the correction factor KLOAD. A failure detecting unit 55 detects a failure of the in-cylinder pressure sensor in accordance with whether the corrected drift parameter Pdftave' is within a predetermined range.

Figure 12:
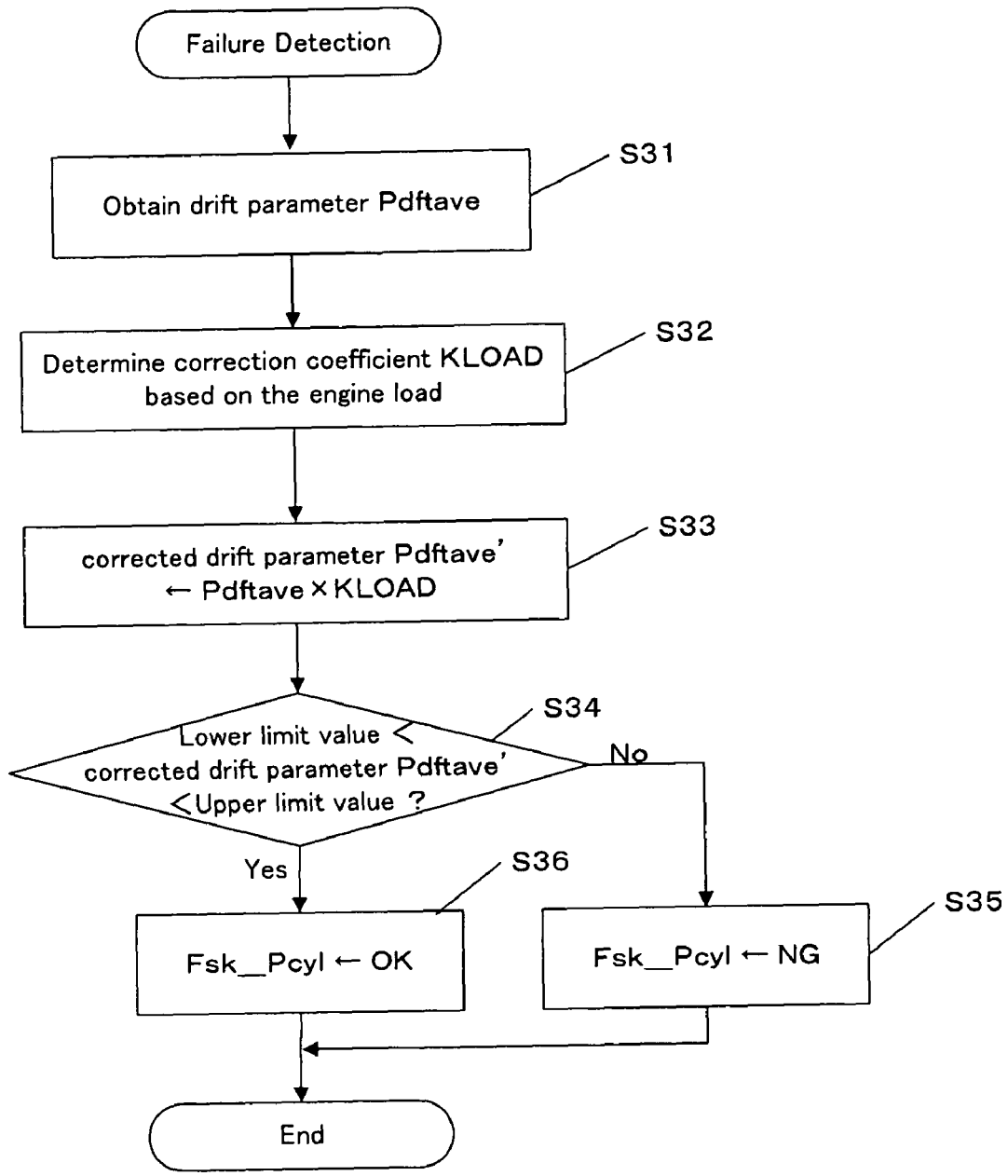
FIG. 12 A flowchart of a process for detecting a failure of the in-cylinder pressure sensor in accordance with the third embodiment of the present invention.

FIG. 12 is a flowchart of a process for detecting a failure of the in-cylinder pressure sensor in accordance with the third embodiment. For example, this process is performed, preferably during the exhaust stroke, in each combustion cycle. In one embodiment, one combustion cycle corresponds to 720 crank angle degrees.

In step S31, the drift parameter Pdftave is obtained from a routine (for example, FIG. 7) for determining the drift parameter of the in-cylinder pressure. In step S32, the correction coefficient KLOAD is determined by referring to a predetermined map based on the intake manifold pressure PB detected by the intake manifold pressure sensor.

Figure 13:
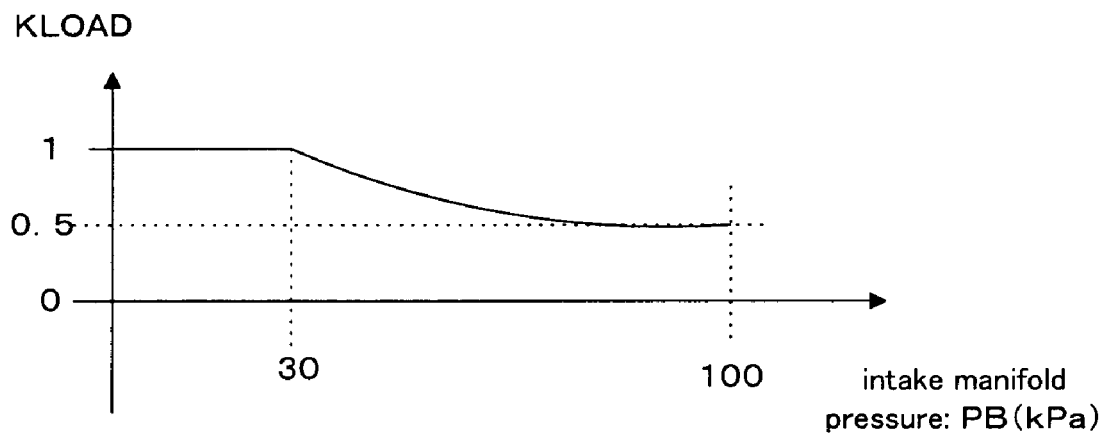
FIG. 13 A map indicating a correction coefficient according to an operating condition in accordance with the second embodiment of the present invention.

An example of such a map is shown in FIG. 13. The engine temperature increases with increase of the engine load (that is, with increase of the intake manifold pressure PB). As the engine temperature becomes higher, the amount of drift tends to increase even though the in-cylinder pressure sensor is normal. Therefore, the correction coefficient KLOAD is set to be smaller as the engine load becomes higher, so that the drift parameter is independent of the engine load.

In step S33, the corrected drift parameter Pdftave' is calculated by multiplying the drift parameter Pdftave by the correction coefficient KLOAD. In step S34, it is determined whether or not the corrected drift parameter Pdftave' is within a predetermined range that is defined by an upper limit value (for example, 2 mV) and a lower limit value (for example, −2 mV). If the corrected drift parameter Pdftave' is not within the range, it is determined that there is a probability that the in-cylinder pressure sensor is faulty and then NG is set in the flag Fsk_Pcyl (S35). If the corrected drift parameter Pdftave' is within the range, it is determined that the in-cylinder pressure sensor is normal and then OK is set in the flag Fsk_Pcyl (S36).

The final failure determination process, which is shown in FIG. 6 in accordance with the first embodiment, is applicable to the third embodiment in a similar way. Similarly to the first embodiment, the drift amount Pdft may be used as the drift parameter, in place of the statistically-processed value Pdftave.

Instead of the engine load, another parameter that can represent the operating condition of the engine may be used. In one embodiment, the engine water temperature TW that is detected by the engine water temperature sensor 21 (FIG. 1) can be used. For example, the amount of change of the engine water temperature per unit time may be used.

Embodiment 4

Figure 14:
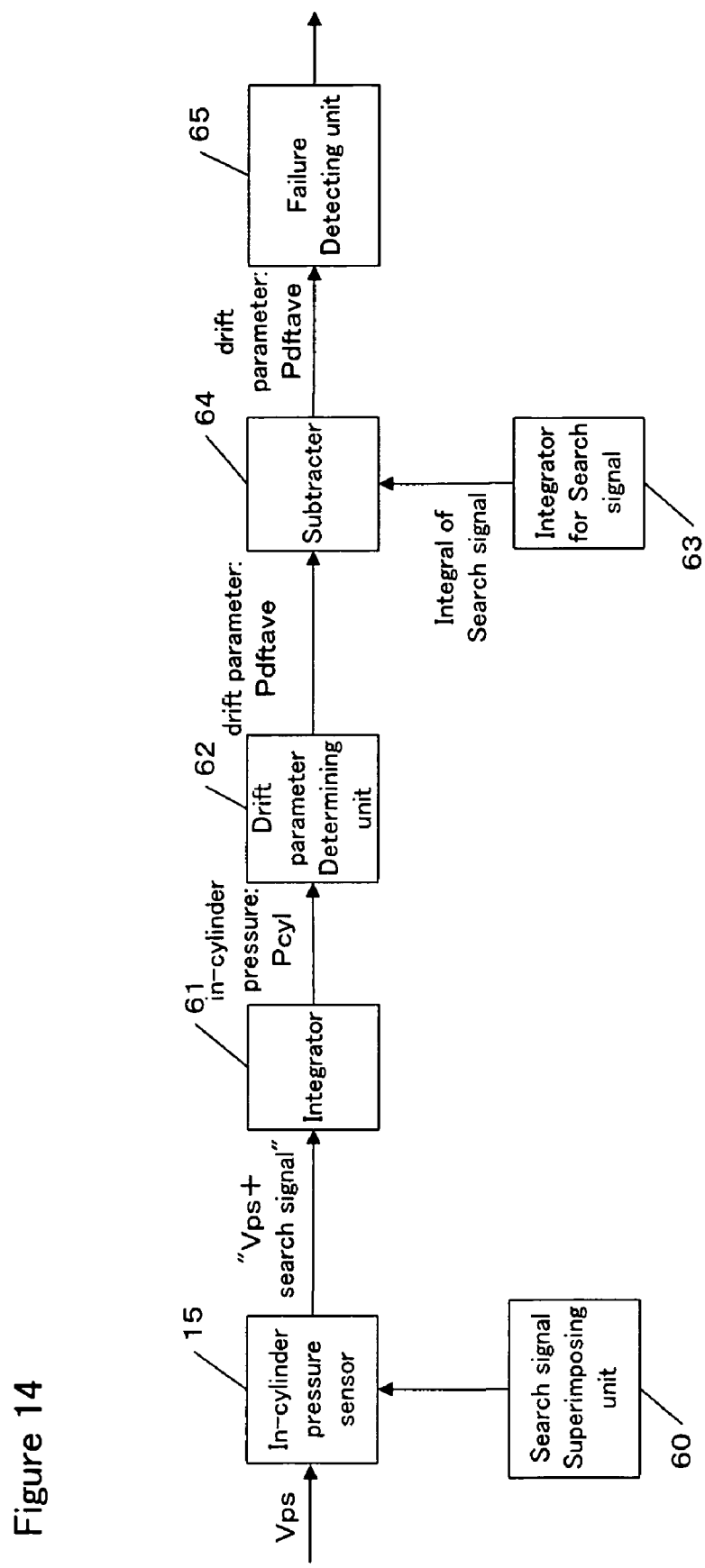
FIG. 14 A block diagram of an apparatus for determining a failure in accordance with a fourth embodiment of the present invention.

FIG. 14 is a block diagram of an apparatus for determining a failure of the in-cylinder pressure sensor in accordance with a fourth embodiment of the present invention. In this embodiment, a drift is intentionally contained in the in-cylinder pressure sensor so as to more accurately determine a failure of the in-cylinder pressure sensor.

A search signal superimposing unit 60 intentionally imposes a predetermined load on the sensor element 25 (FIG. 2) of the in-cylinder pressure sensor such that a predetermined DC component (for example, 1 mV, which will be hereinafter referred to as a search signal) is superimposed on the output of the in-cylinder pressure sensor 15. The search signal superimposing unit 60 is, for example, an actuator that is connected to the in-cylinder pressure sensor. It imposes the predetermined load on the sensor element 25 in response to a control signal from the ECU 1. As a result, the search signal is superimposed on the output of the in-cylinder pressure sensor.

The output of the in-cylinder pressure sensor is "Vps+DC component". An integrator 61 calculates the in-cylinder pressure Pcyl by integrating the output of the in-cylinder pressure sensor as shown in the equation (6). The superimposing of the search signal enables a drift corresponding to the search signal to be intentionally included in the in-cylinder pressure Pcyl.

$$Pcyl = f(Vps + \text{search signal}) \quad (6)$$

A drift parameter determining unit 62 determines the drift parameter in a similar way to the drift parameter determining unit 32 shown in FIG. 4 of the first embodiment. A search signal integrator 63 calculates the integral of the search signal over one combustion cycle. A subtracter 64 subtracts the integral of the search signal from the drift parameter Pdftave. A failure detecting unit 65 detects a failure of the in-cylinder pressure sensor in accordance with whether or not the drift parameter Pdftave is within a predetermined range.

When the in-cylinder pressure sensor is normal, the amount of the "intentional drift" generated by the superimposing of the search signal can be estimated from the search signal. When the in-cylinder pressure sensor is faulty, the amount of the intentional drift increases. Therefore, a failure of the in-cylinder pressure sensor can be detected more easily by subtracting from the drift parameter the drift amount estimated based on the search signal.

As described above referring to FIG. 2, the initial load is imposed on the sensor element 25 of the in-cylinder pressure sensor. Variations may occur in the initial load. Such variations in the initial load may vary the amount of drift. If the amount of drift varies, an erroneous determination for a failure of the in-cylinder pressure sensor may be made.

However, according to this embodiment, the amount of drift increases when the in-cylinder pressure sensor is faulty because the intentional drift is caused to occur in the in-cylinder pressure. Therefore, a failure of the in-cylinder pressure sensor can be determined without being influenced by such variations in the initial load. In order to determine a failure of the in-cylinder pressure sensor more accurately, it is preferable that the magnitude of the search signal is established so that the amount of the intentional drift is sufficiently large with respect to variations in the initial load.

Alternatively, a failure of the in-cylinder pressure sensor may be detected based on the drift parameter including the intentional drift, without the subtraction by the subtracter 64.

Figure 15:
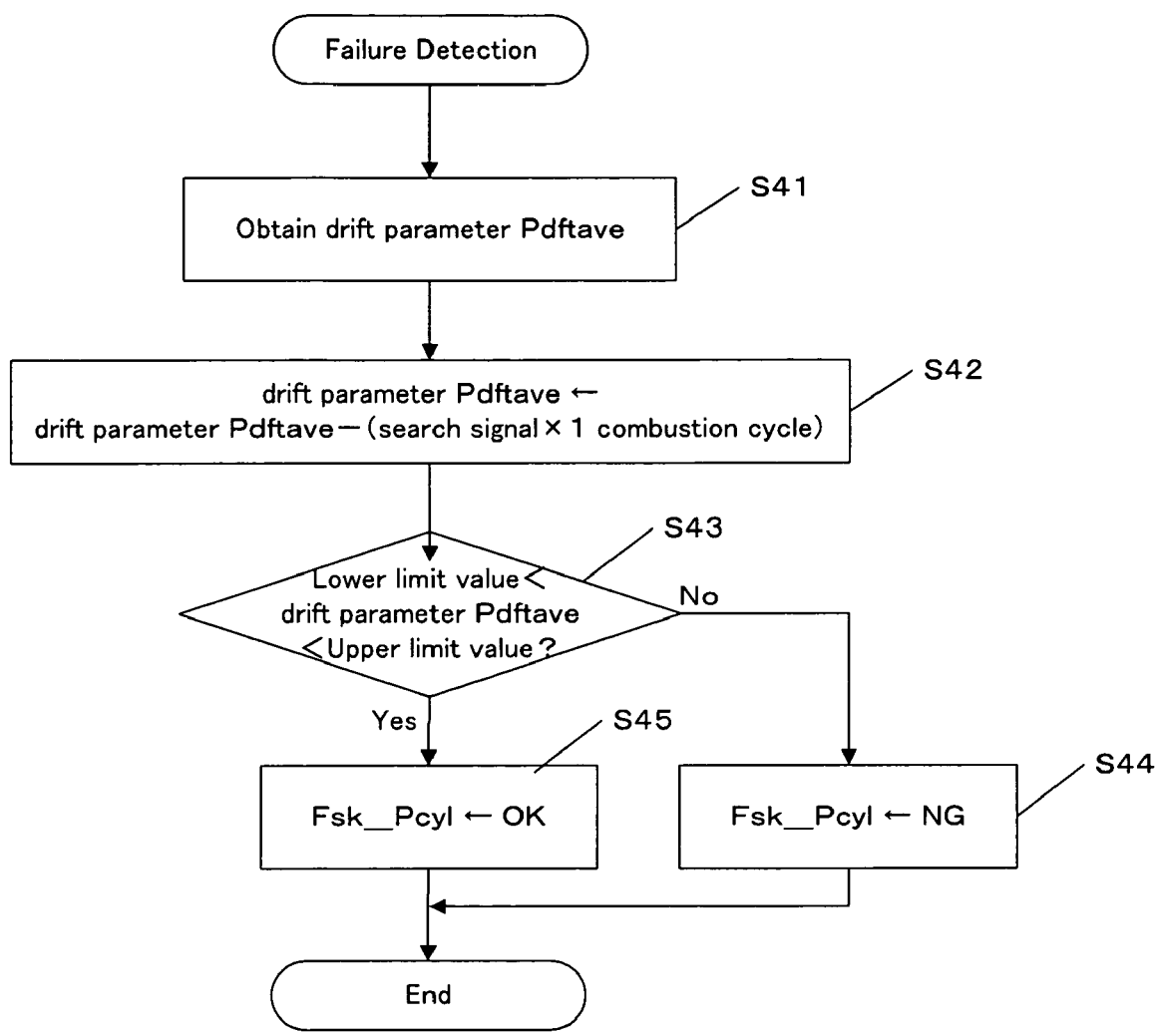
FIG. 15 A flowchart of a process for detecting a failure of the in-cylinder pressure sensor in accordance with the fourth embodiment of the present invention.

FIG. 15 is a flowchart of a process for detecting a failure of the in-cylinder pressure sensor in accordance with the fourth embodiment. For example, this process is performed, preferably during the exhaust stroke, in each combustion cycle. In one embodiment, one combustion cycle corresponds to 720 crank angle degrees.

In step S41, the drift parameter Pdftave is obtained from a routine (for example, FIG. 7) for determining the drift parameter of the in-cylinder pressure. In step S42, the integral of the search signal (that is, "the search signal×1 combustion cycle") is subtracted from the drift parameter Pdftave.

In step S43, it is determined whether or not the drift parameter Pdftave is within a predetermined range that is defined by an upper limit value (for example, 2 mV) and a lower limit value (for example, −2 mV). If the drift parameter Pdftave is not within the range, it is determined that there is a probability that the in-cylinder pressure sensor is faulty and then NG is set in a flag Fsk_Pcyl (S44). If the drift parameter Pdftave is within the range, it is determined that the in-cylinder pressure sensor is normal and then OK is set in the flag Fsk_Pcyl (S45).

The final failure determination process, which is shown in FIG. 6 in accordance with the first embodiment, is applicable to the fourth embodiment in a similar way. Similarly to the first embodiment, the drift amount Pdft may be used as the drift parameter, in place of the statistically-processed value Pdftave.

Embodiment 5

Figure 16:
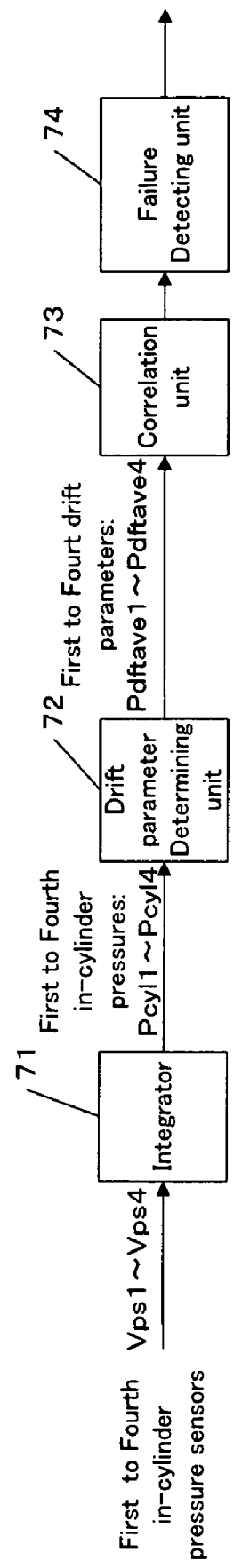
FIG. 16 A block diagram of an apparatus for determining a failure in accordance with a fifth embodiment of the present invention.

FIG. 16 is a block diagram of an apparatus for determining a failure of the in-cylinder pressure sensor in accordance with a fifth embodiment of the present invention. In this embodiment, a correlation among outputs of in-cylinder pressure sensors of a plurality of cylinders is used.

For each cylinder, an integrator 71 and a drift parameter determining unit 72 determine the in-cylinder pressure and the drift parameter, respectively, in a similar way to the integrator 31 and the drift parameter determining unit 32 shown in FIG. 4 of the first embodiment. As described above referring to FIG. 1, the 4-cylinder engine is used in this embodiment. Accordingly, for the first to fourth cylinders, the in-cylinder pressures Pcyl1 to Pcyl4 are determined and then the drift parameters Pdftave1 to Pdftave4 are determined.

A correlation unit 73 determines a correlation among the drift parameters of the plurality of cylinders. In this embodiment, the maximum value and the minimum value are taken from the four drift parameters. Alternatively, another correlation value may be used. For example, a correlation value may be determined by calculating an average value of the four drift parameters or by calculating a median value of the four drift parameters or the like. A failure detecting unit 74 determines whether there is a faulty in-cylinder pressure sensor in any of the cylinders in accordance with whether the maximum value and minimum value are within a predetermined range.

According to this embodiment, a failure of the in-cylinder pressure sensor can be more accurately detected because a correlation among the drift parameters for a plurality of cylinders is made.

Figure 17:
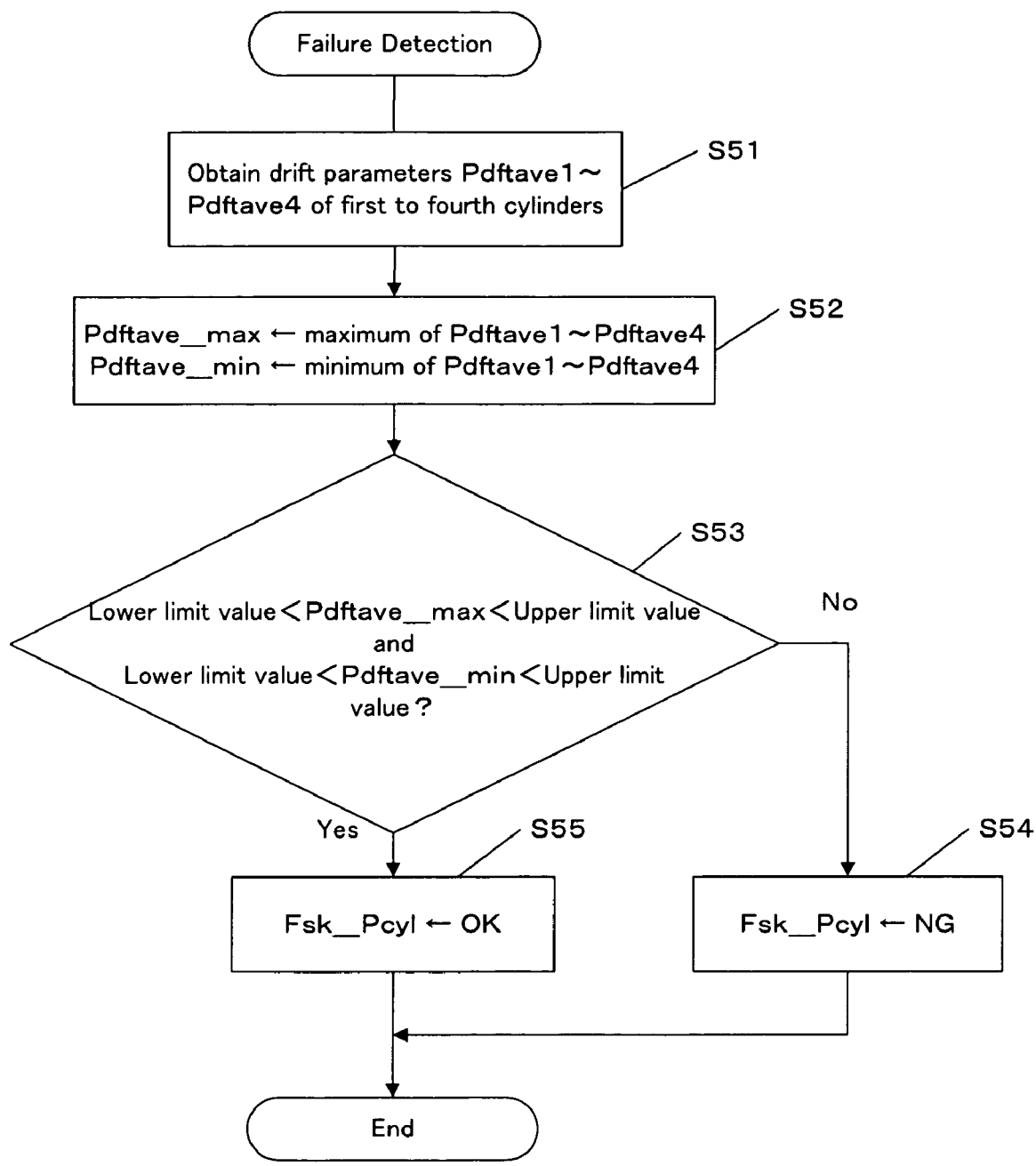
FIG. 17 A flowchart of a process for detecting a failure of the in-cylinder pressure sensor in accordance with the fifth embodiment of the present invention.

FIG. 17 is a flowchart of a process for detecting a failure of the in-cylinder pressure sensor in accordance with the fifth embodiment. For example, this process is performed, preferably during the exhaust stroke, in each combustion cycle. In one embodiment, one combustion cycle corresponds to 720 crank angle degrees.

In step S51, the drift parameters Pdftave1 to Pdftave4 for the first to fourth cylinders are obtained. These drift parameters are obtained from a routine (for example, FIG. 7) for determining the drift parameter of the in-cylinder pressure, which is performed for each of the first to fourth cylinders. In step S52, the maximum value and the minimum value are selected from the drift parameters Pdftave1 to Pdftave4 and are set in Pdftave_max and Pdftave_min, respectively.

In step S53, it is determined whether or not the maximum value Pdftave_max among the drift parameters is within a predetermined range that is defined by an upper limit value (for example, 2 mV) and a lower limit value (for example, −2 mV). It is further determined whether or not the minimum value Pdftave_min among the drift parameters is within the predetermined range. If at least one of the maximum value and the minimum value is not within the predetermined range, it is determined that there is a probability that any of the in-cylinder pressure sensors is faulty and then NG is set in a flag Fsk_Pcyl (S54). If both of the maximum and minimum values are within the predetermined range, it is determined that the in-cylinder pressure sensors for all the cylinders are normal and then OK is set in the flag Fsk_Pcyl (S55).

Alternatively, if the maximum value Pdftave_max of the drift parameters is not within the predetermined range, it may be determined that there is a probability that the in-cylinder pressure sensor corresponding to the maximum value Pdftave_max is faulty. Similarly, if the minimum value Pdftave_min is not within the predetermined range, it may be determined that there is a probability that the in-cylinder pressure sensor corresponding to the minimum value Pdftave_min is faulty.

The final failure determination process, which is shown in FIG. 6 in accordance with the first embodiment, is applicable to the fifth embodiment. Similarly to the first embodiment, the drift amount Pdft may be used as the drift parameter, in place of the statistically-processed value Pdftave.

Embodiment 6

Figure 18:
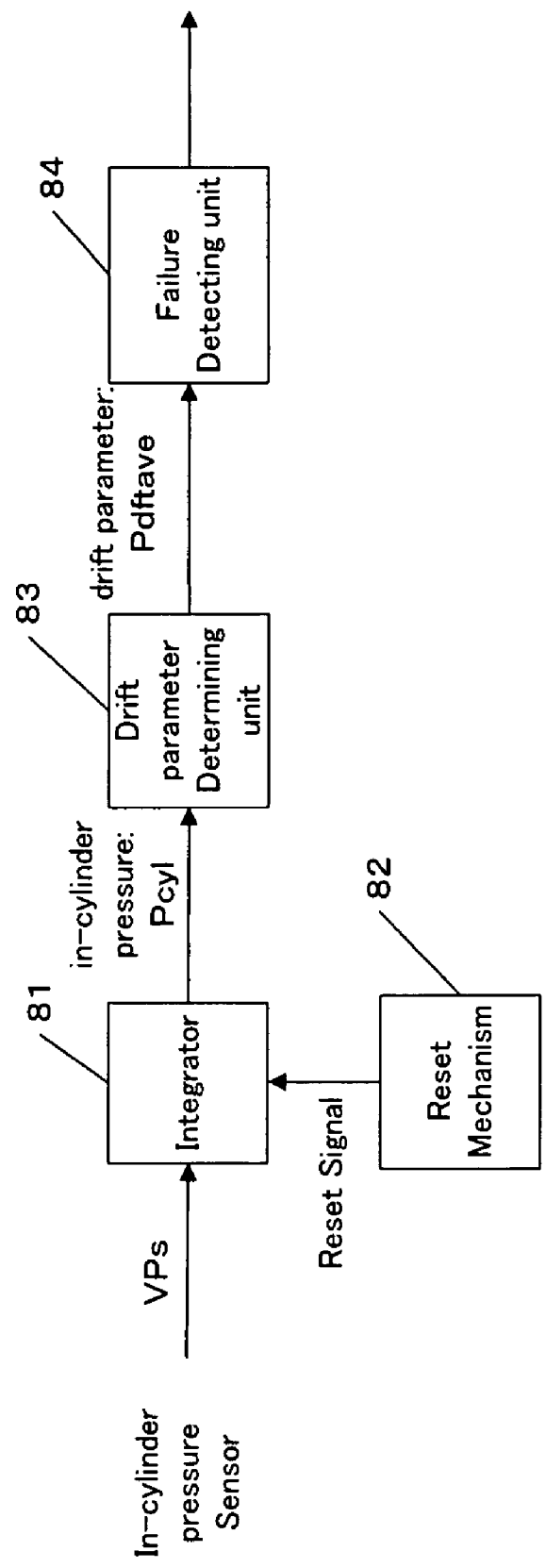
FIG. 18 A block diagram of an apparatus for determining a failure in accordance with a sixth embodiment of the present invention.

FIG. 18 is a block diagram of an apparatus for determining a failure of the in-cylinder pressure sensor in accordance with a sixth embodiment of the present invention. In this embodiment, a mechanism for resetting the in-cylinder pressure is provided. Such a resetting operation enables the drift parameter to be more accurately and easily determined.

An integrator 81 integrates the output Vps of the in-cylinder pressure sensor to determine the in-cylinder pressure Pcyl. A reset mechanism 82 generates a reset signal at a predetermined timing. The reset signal is a signal for resetting the in-cylinder pressure to a predetermined reference value (for example, zero). In this embodiment, the reset signal is generated at a predetermined timing in each combustion cycle. The integrator 81 outputs the in-cylinder pressure Pcyl that has been reset to the reference value in response to the reset signal.

A drift parameter determining unit 83 determines the drift parameter Pdftave based on a difference between the in-cylinder pressure Pcyl_pre before the reset operation and the in-cylinder pressure Pcyl_post after the reset operation.

A failure detecting unit 84 can detect a failure of the in-cylinder pressure sensor in accordance with any one of the first to fifth embodiments. If the first embodiment is employed, a failure of the in-cylinder pressure sensor is determined in accordance with whether or not the drift parameter is within a predetermined range. If the second embodiment is employed, the predetermined range is established in accordance with the maximum value of the in-cylinder pressure. If the third embodiment is employed, the drift parameter is corrected in accordance with the operating condition of the engine, and a failure of the in-cylinder pressure sensor is determined in accordance with whether or not the corrected drift parameter is within a predetermined range. If the fourth embodiment is employed, a search signal is superimposed on the output of the in-cylinder pressure sensor. According to the fifth embodiment, a correlation among the drift parameters of a plurality of cylinders is determined and then a failure of the in-cylinder pressure sensor is determined based on the correlation thus determined.

Figure 19:
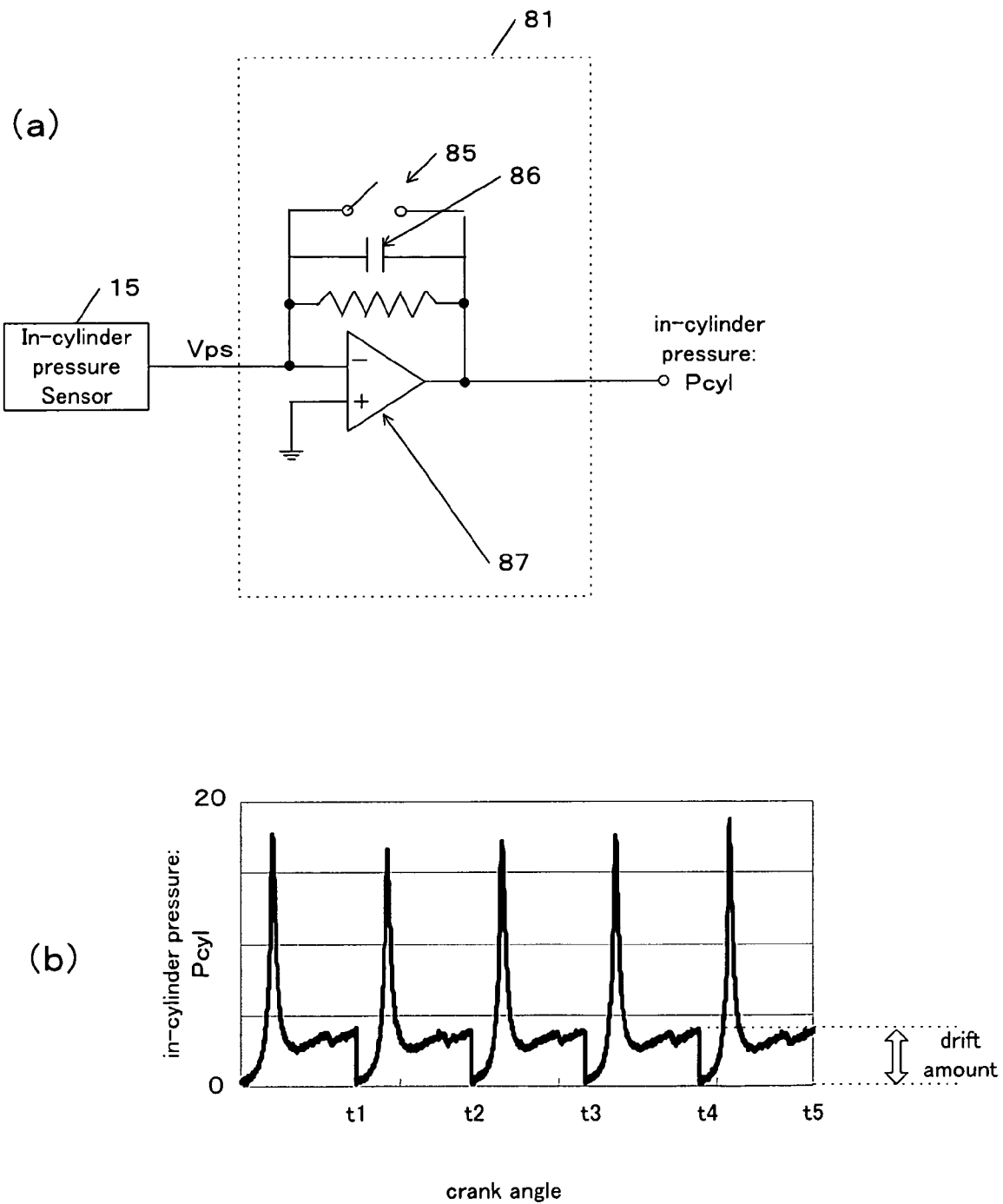
FIG. 19 A figure showing a mechanism and its operation for resetting the in-cylinder pressure in accordance with the sixth embodiment of the present invention.

Referring to FIG. 19, an example of functions of the reset mechanism and the reset signal will be described. FIG. 19(a) shows an exemplary circuit of the integrator 81. The integrator has a switching element 85, a capacitor 86 and an operational amplifier 87. The switching element 85 is closed in response to the reset signal. When the element is in a closed state, there is no potential difference across the capacitor 86 and hence the output of the operational amplifier 87 is reset to a reference value.

FIG. 19(b) shows an exemplary waveform of the in-cylinder pressure Pcyl that is output from the integrator 81 when the reset operation is performed. The reset operation is performed at time t1, t2, t3, t4 and t5. The in-cylinder pressure Pcyl is reset to the reference value (zero in this example) every time the reset operation is performed. A difference between the in-cylinder pressure before the reset operation and the in-cylinder pressure after the reset operation represents the amount of drift during one combustion cycle.

Figure 20:
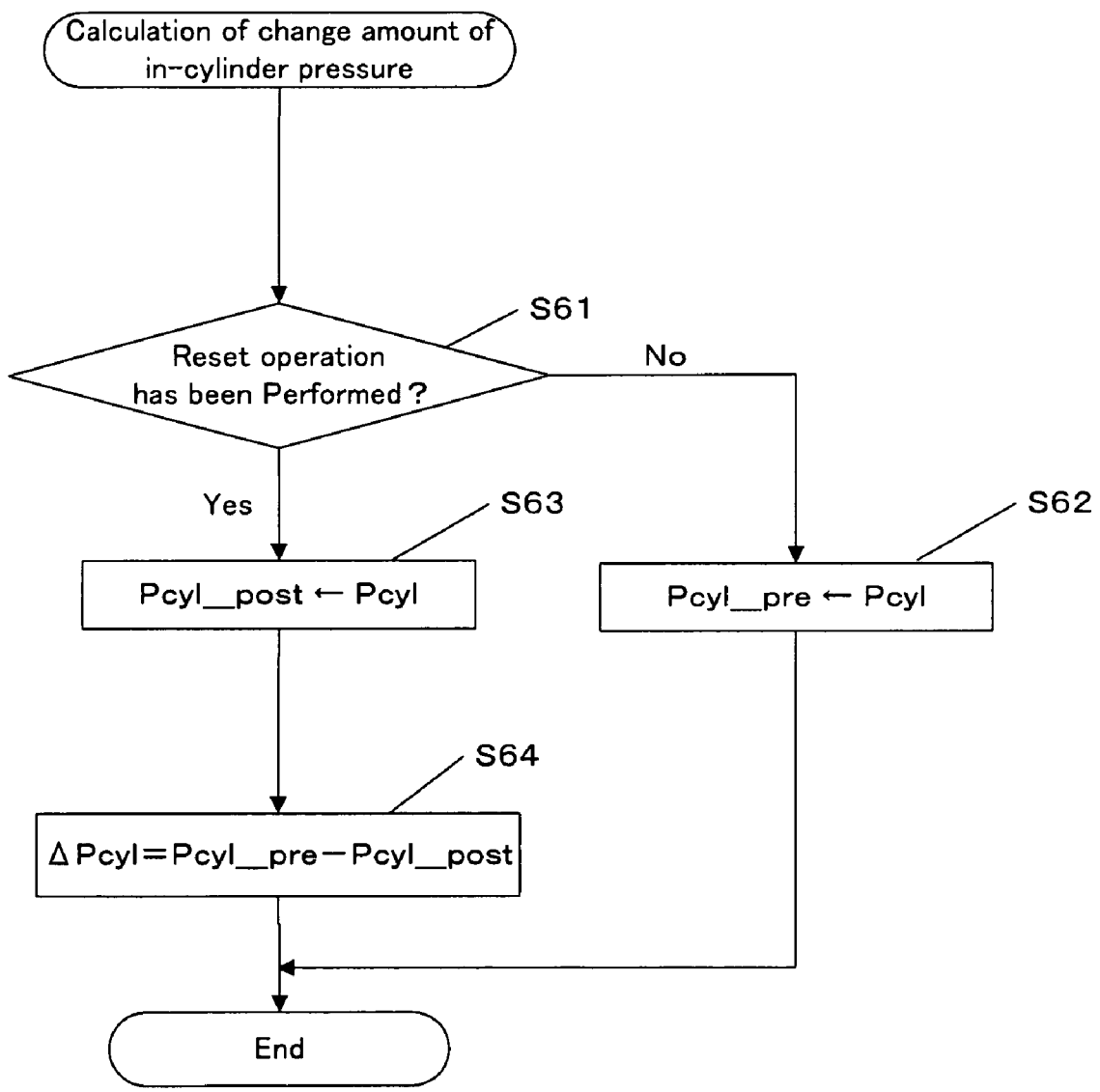
FIG. 20 A flowchart of a process for calculating a rate of change of the in-cylinder pressure in response to the reset operation in accordance with the sixth embodiment of the present invention.

FIG. 20 is a flowchart of a process for calculating the amount of change between the in-cylinder pressure before the reset operation and the in-cylinder pressure after the reset operation. This process is performed at a predetermined time interval (for example, every one degree of crank angle) that is shorter than one combustion cycle.

In step S61, it is determined whether or not the in-cylinder pressure has been reset in response to the reset signal. If the decision of step S61 is No, the in-cylinder pressure Pcyl that is output from the integrator 81 at this time is stored as the in-cylinder pressure Pcyl_pre before the reset operation (S62). If the decision of Step S61 is Yes, the in-cylinder pressure Pcyl that is output from the integrator 81 at this time is stored as the in-cylinder pressure Pcyl_post after the reset operation (S63). In step S64, a difference between the in-cylinder pressure Pcyl_pre before the reset operation and the in-cylinder pressure Pcyl_post after the reset operation is calculated as the change amount ΔPcyl.

Figure 21:
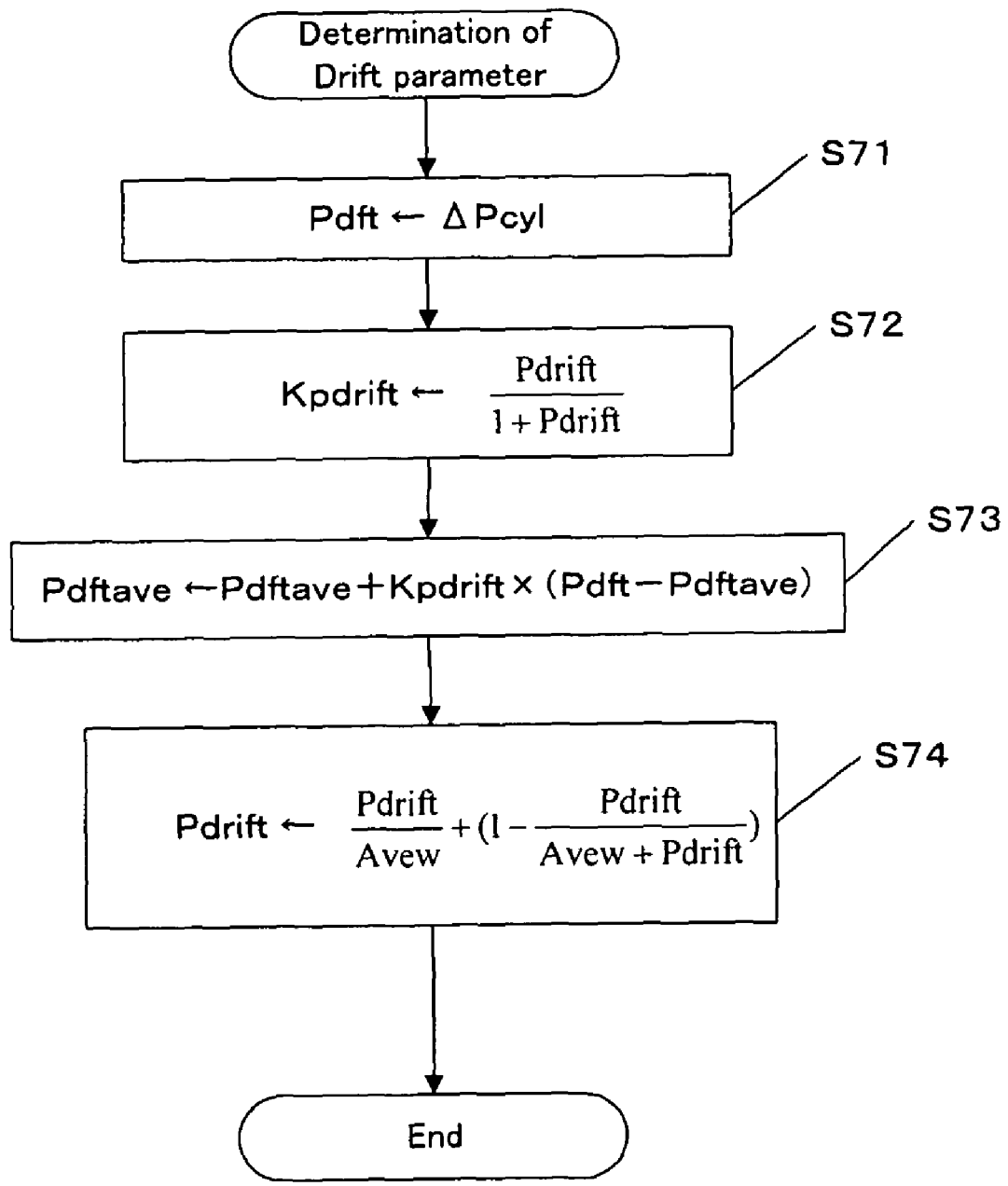
FIG. 21 A flowchart of a process for determining a drift parameter in accordance with the sixth embodiment of the present invention.

FIG. 21 is a flowchart of a process for determining the drift parameter. In step S71, the amount of change ΔPcyl calculated in step S64 of FIG. 20 is set in the drift amount Pdft of the in-cylinder pressure. The drift amount Pdft represents the amount of drift included in the in-cylinder pressure during one combustion cycle. Since step S72 through step S74 are the same as step S14 through step S16 of FIG. 7, description about these steps is omitted.

As described above, a failure of the in-cylinder pressure sensor can be determined by applying the failure determination technique according to any one of the above-described first to fifth embodiments to the drift parameter thus determined.

Embodiment 7

Figure 22:
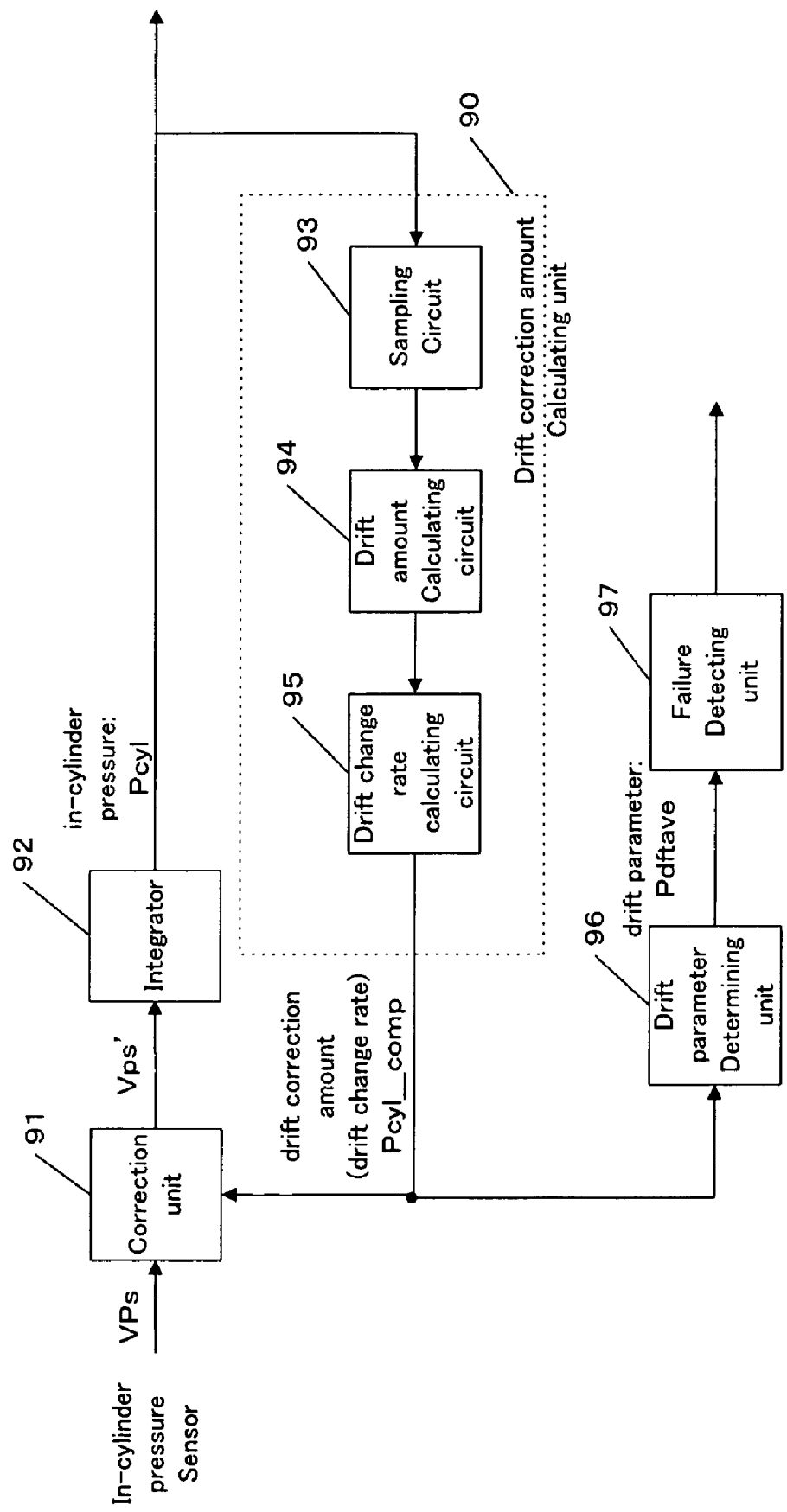
FIG. 22 A block diagram of an apparatus for determining a failure in accordance with a seventh embodiment of the present invention.

FIG. 22 is a block diagram of an apparatus for determining a failure of the in-cylinder pressure sensor in accordance with a seventh embodiment of the present invention. In some cases, a mechanism for calculating a drift correction amount may be provided so as to determine the in-cylinder pressure containing no drift. In this embodiment, this mechanism is utilized for determining the drift parameter.

A correction unit 91 corrects a rate of change of the in-cylinder pressure by subtracting a drift correction amount Pcyl_comp from the rate of change Vps of the in-cylinder pressure (that is, from the output of the in-cylinder pressure sensor 15). An integrator 92 integrates the corrected change rate Vps' to calculate the in-cylinder pressure Pcyl. A drift correction amount calculating unit 90 is a unit for calculating the drift correction amount Pcyl_comp. The drift correction amount Pcyl_comp is fed back to the correction unit 91.

Such feedback operation is repeated at a predetermined time interval. Therefore, at every time interval, the drift component Pcyl_comp is removed from the output Vps of the in-cylinder pressure sensor. Since the output Vps' of the in-cylinder pressure sensor from which the drift has been removed is integrated, drift can be prevented from appearing in the waveform of the in-cylinder pressure.

In this embodiment, the process by the drift correction amount calculating unit 90 is performed in a cycle of Tn that is equal to the length of one combustion cycle. The processes by the correction unit 91 and the integral unit 92 are performed in a cycle of Tk that is shorter than Tn. Preferably, Tk is equal to the length of a cycle in which the output of the in-cylinder pressure sensor is converted from analog to digital. Thus, every time the output of the in-cylinder pressure sensor is obtained as a digital value Vps, Vps can be corrected with the drift correction amount Pcyl_comp.

A drift parameter determining unit 96 determines the drift parameter Pdftave based on the drift correction amount Pcyl_comp. A failure detecting unit 97 can detect a failure of the in-cylinder pressure sensor in accordance with any one of the first to fifth embodiments, as described in the section of the sixth embodiment.

Figure 23:
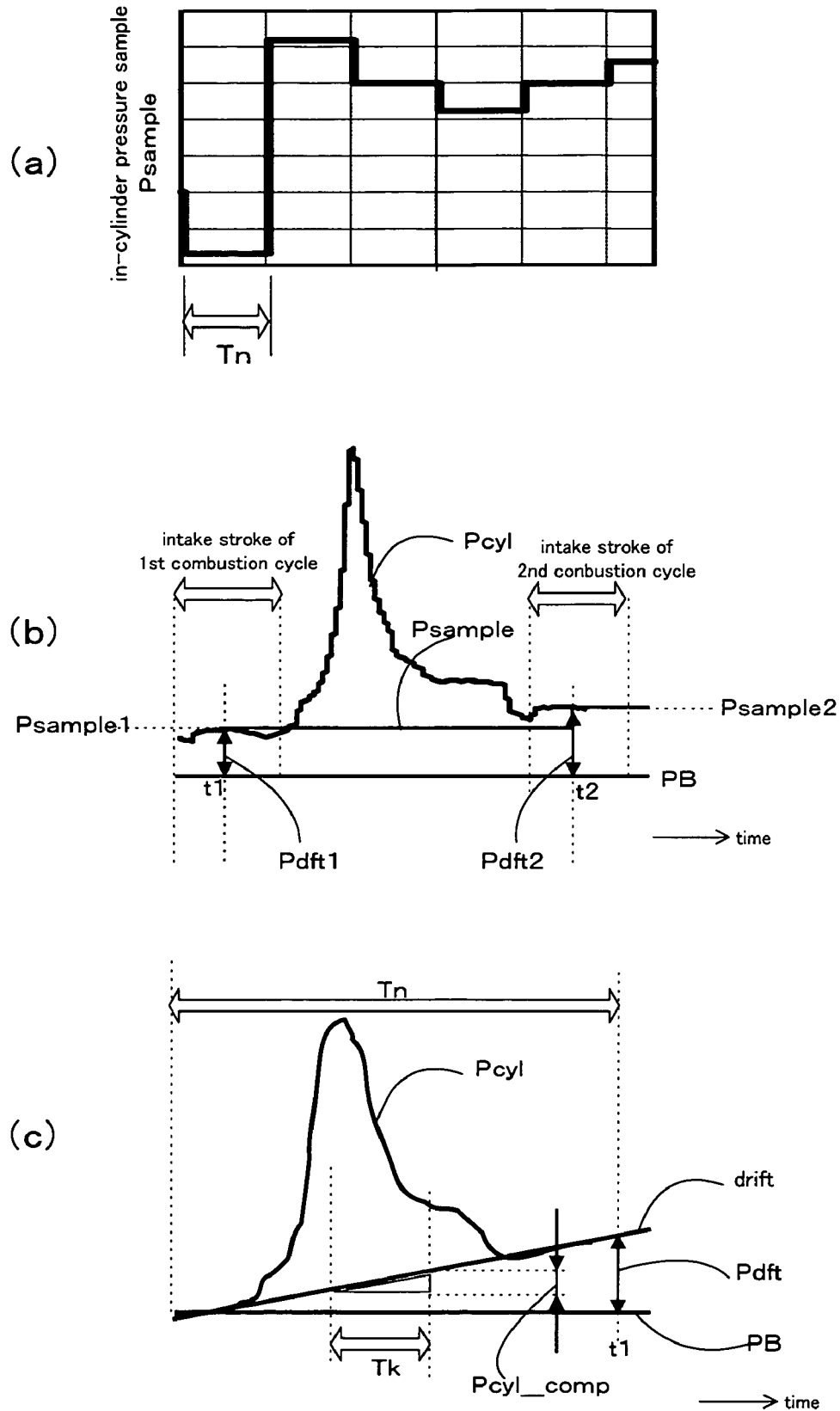
FIG. 23 A figure showing a technique for calculating a drift correction amount Pcyl_comp in accordance with the seventh embodiment of the present invention.

The drift correction amount calculating unit 90 includes a sampling circuit 93, a drift amount calculating circuit 94 and a drift change rate calculating unit 95. Sampling by the sampling circuit 93 is performed in a cycle of Tn. The sampling circuit 93 samples the in-cylinder pressure Pcyl at a predetermined crank angle (CRK) in each combustion cycle. Preferably, the in-cylinder pressure Pcyl is sampled at a predetermined crank angle during the intake stroke. The in-cylinder pressure sample Psample thus sampled is held in the sampling circuit 93 until the next sampling. FIG. 23(*a*) shows an exemplary waveform of the in-cylinder pressure sample Psample.

The drift amount calculating unit 94 calculates the drift amount Pdft in accordance with the equation (7) in response to generation of the in-cylinder pressure sample Psample by the sampling circuit 93. The drift amount Pdft represents the amount of drift during one combustion cycle.

$$\text{drift amount } Pdft = \text{in-cylinder pressure } P\text{sample} - \text{reference value} \quad (7)$$

The reference value is established to indicate the in-cylinder pressure when there is no influence of drift. In one example, the output PB of the intake manifold pressure sensor 20 (FIG. 1) is sampled at the same timing as the sampling by the sampling circuit 93. The sampled PB is used as the reference value. As long as there is no influence of drift, the in-cylinder pressure and the intake manifold pressure are almost equal because the intake valve is opened during the intake stroke. A value obtained by subtracting the intake manifold pressure PB from the in-cylinder pressure Pcyl indicates the drift amount Pdft accumulated in the current combustion cycle.

FIG. 23(*b*) shows an example of the drift amount Pdft. The in-cylinder pressure sample Psample1 that is obtained at time t1 during the intake stroke in the first combustion cycle is held in the sampling circuit 93 until the next in-cylinder pressure sample is obtained. A difference from the intake manifold pressure PB, which is sampled at time t1, indicates the drift amount Pdft1 for the first combustion cycle. Similarly, the in-cylinder pressure sample Psample2 that is obtained at time t2 during the intake stroke in the second combustion cycle is held in the sampling circuit 93 until the next in-cylinder pressure sample is obtained. A difference from the intake manifold pressure PB, which is sampled at time t2, indicates the drift amount Pdft2 for the second combustion cycle. Thus, the drift amount Pdft is determined in each combustion cycle.

Referring back to FIG. 22, the drift change rate calculating unit 95 calculates the drift change rate Pcyl_comp in accordance with the equation (8). The drift change rate Pcyl_comp indicates a rate of change of the drift per time of Tk.

$$\text{drift change rate } Pcyl\_comp = \text{drift amount } Pdft / \text{the number of times of sampling} \quad (8)$$

where the number of times of sampling=one combustion cycle/Tk

As described above, in one embodiment, Tk is equal to the length of a cycle in which the output of the in-cylinder pressure sensor is converted from analog to digital. Thus, the output Vps of the in-cylinder pressure sensor, which is obtained every Tk, can be corrected with the drift change rate Pcyl_comp per Tk.

FIG. 23(*c*) shows the drift change rate Pcyl_comp. The drift amount calculating circuit 94 calculates the drift amount Pdft at time t1. The drift change rate Pcyl_comp per Tk can be calculated by dividing the drift amount Pdft by the number of times of sampling. The drift change rate Pcyl_comp thus calculated is fed back to the correction unit 91 (FIG. 22) as the drift correction amount.

Figure 24:
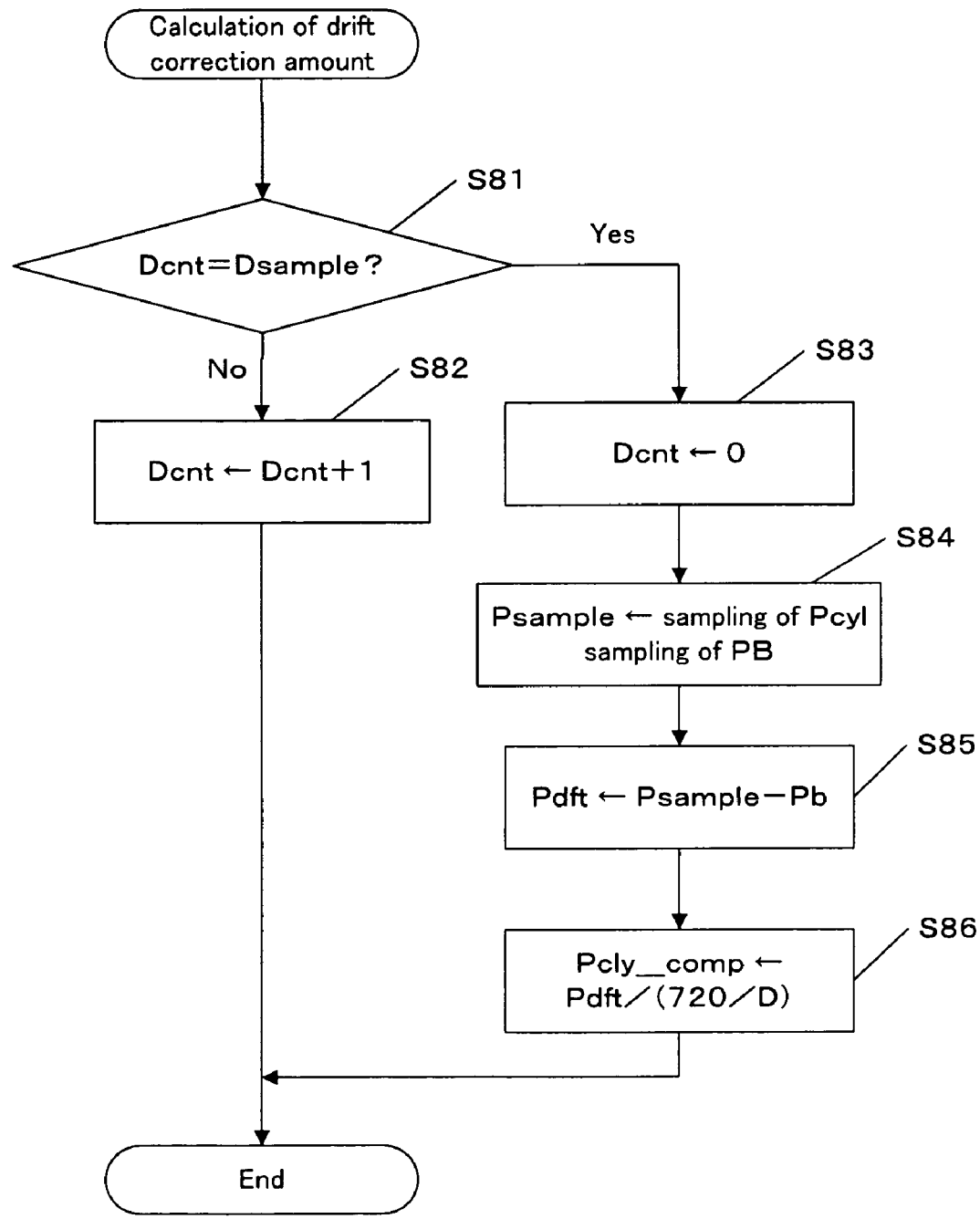
FIG. 24 A flowchart of a process for determining a drift correction amount in accordance with the seventh embodiment of the present invention.

FIG. 24 is a flowchart of a process for calculating the drift correction amount (drift change rate). This process is performed at every predetermined crank angle (for example, every one degree).

In step S81, it is determined whether or not an up-counter Dcnt has reached a predetermined value Dsample. The up-counter is reset to zero at the start of the intake stroke in each combustion cycle (that is, when the crank angle is zero). The up-counter performs counting in accordance with the crank signal from the crank angle sensor 17 (FIG. 1). In one embodiment, the up-counter counts from 0 to 720. Dsample indicates a predetermined crank angle at which the in-cylinder pressure Pcyl is to be sampled.

If the decision of step S81 is No, the counter Dcnt is incremented because now is not the time to sample the in-cylinder pressure (S81). If the decision of step S81 is Yes, the up-counter is reset to zero (S83). In step S84, the in-cylinder pressure Pcyl is sampled to obtain the in-cylinder pressure sample Psample. Further, the output PB from the intake manifold pressure sensor is sampled. In step S85, a difference between the in-cylinder pressure sample Psample and the intake manifold pressure PB is calculated as the drift amount Pdft. In step S86, the drift amount Pdft is divided by the number of times of sampling to calculate the drift change rate Pcyl_comp. In this embodiment, as described above referring to the equation (8), the crank angle corresponding to one combustion cycle is 720 degrees. Therefore, assuming that D represents the crank angle corresponding to Tk, the number of times of sampling is 720/D.

Figure 25:
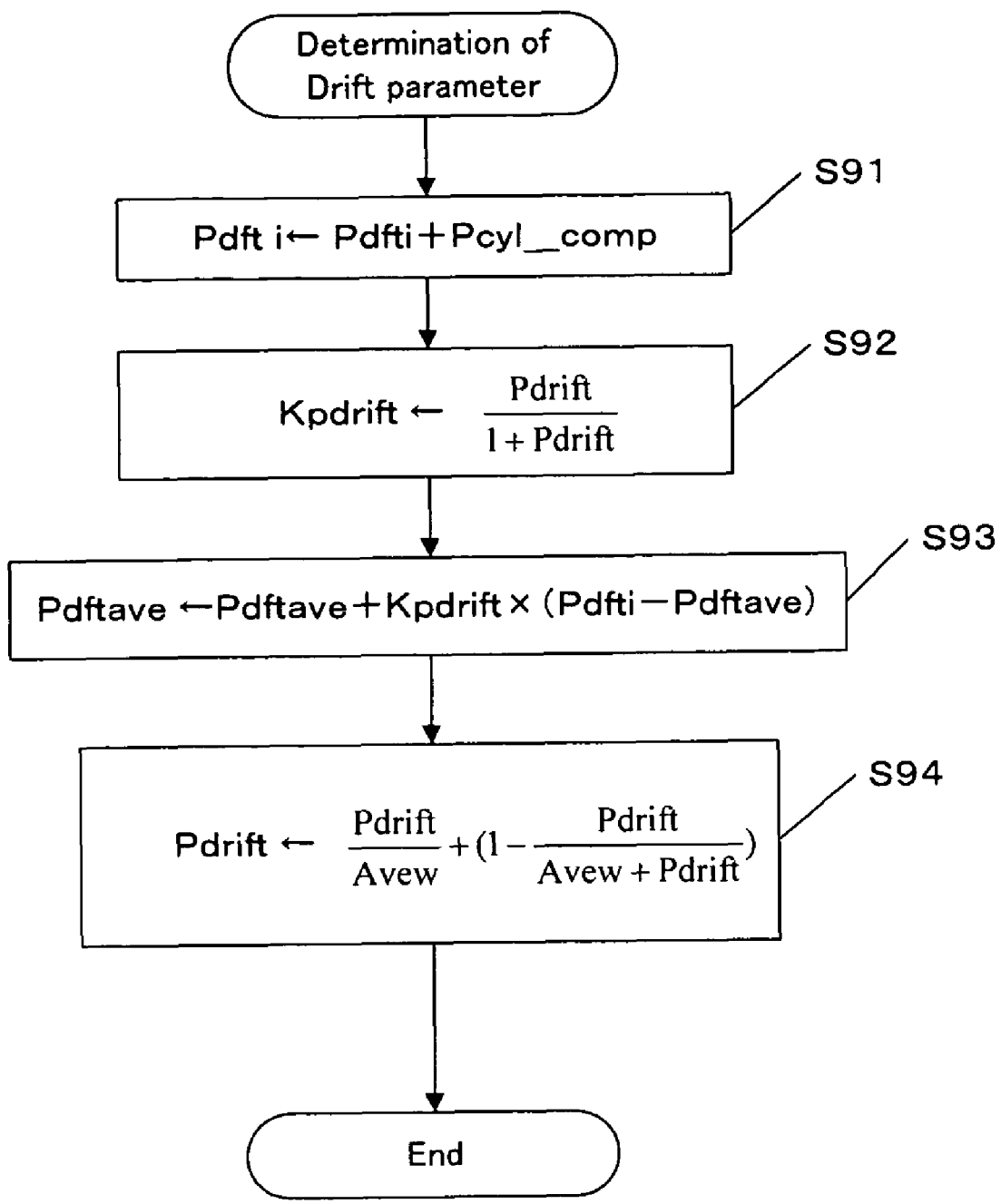
FIG. 25 A flowchart of a process for calculating a drift parameter in accordance with the seventh embodiment of the present invention.

FIG. 25 is a flowchart of a process for determining the drift parameter. This process is performed in a cycle of Tk. In step S91, the drift change rate Pcyl_comp is integrated as shown by the equation (9). That is, the drift change rate Pcyl_comp per crank angle of D is added to the previous value of the drift amount Pdfti of the in-cylinder pressure to calculate the current value of the drift amount Pdfti.

$$\text{current value of } Pdfti = \text{previous value of } Pdfti + Pcyl\_comp \quad (9)$$

The drift amount Pdfti thus calculated indicates the amount of drift of the in-cylinder pressure at the current calculation cycle. Over one combustion cycle, the drift amount Pdfti is calculated in such a manner as to linearly change.

Alternatively, when the process is performed at every crank angle of one degree, "Pcyl_comp/D" is added in the integral operation shown in the equation (9).

Since steps S92 through Step S94 are the same as step S14 through step S16 of FIG. 7, description about these steps is omitted. Thus, the drift parameter Pdftave is calculated in such a manner as to finely and smoothly change in accordance with the drift amount Pdfti.

As described above, a failure of the in-cylinder pressure sensor can be determined by applying the failure determination technique according to any one of the above-described first to fifth embodiments to the drift parameter thus determined.

Another embodiment for calculating the drift change rate Pcyl_comp will be described below.

Figure 26:
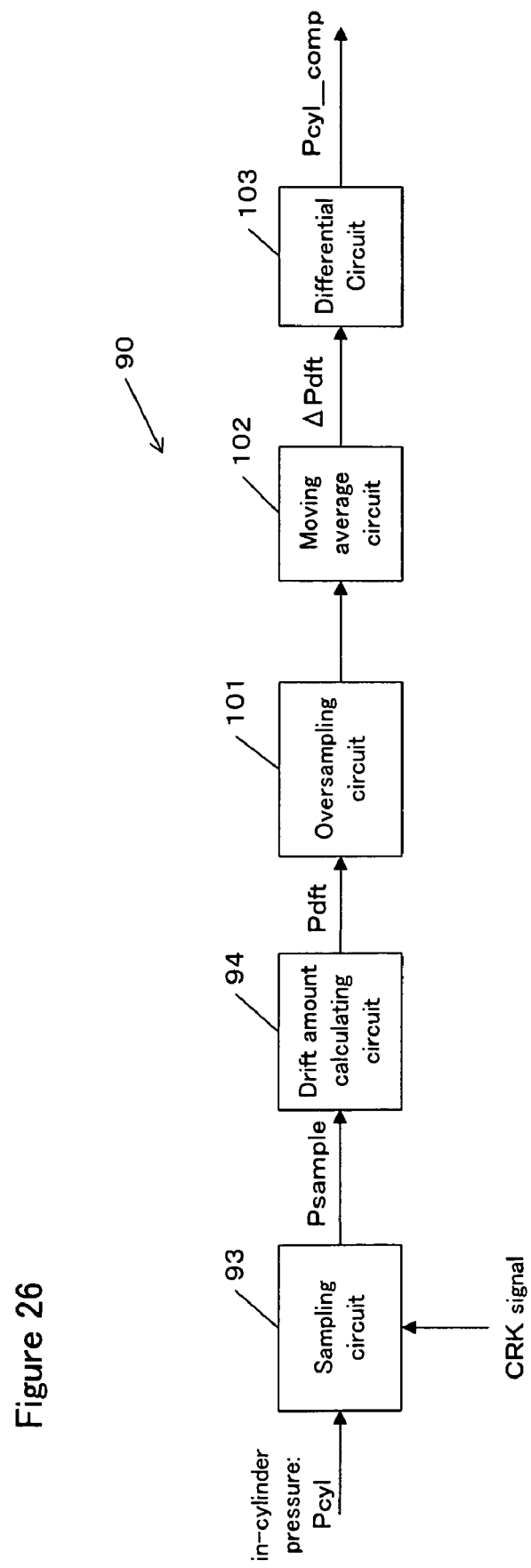
FIG. 26 A block diagram of another mechanism for calculating a drift correction amount in accordance with the seventh embodiment of the present invention.
Figure 27:
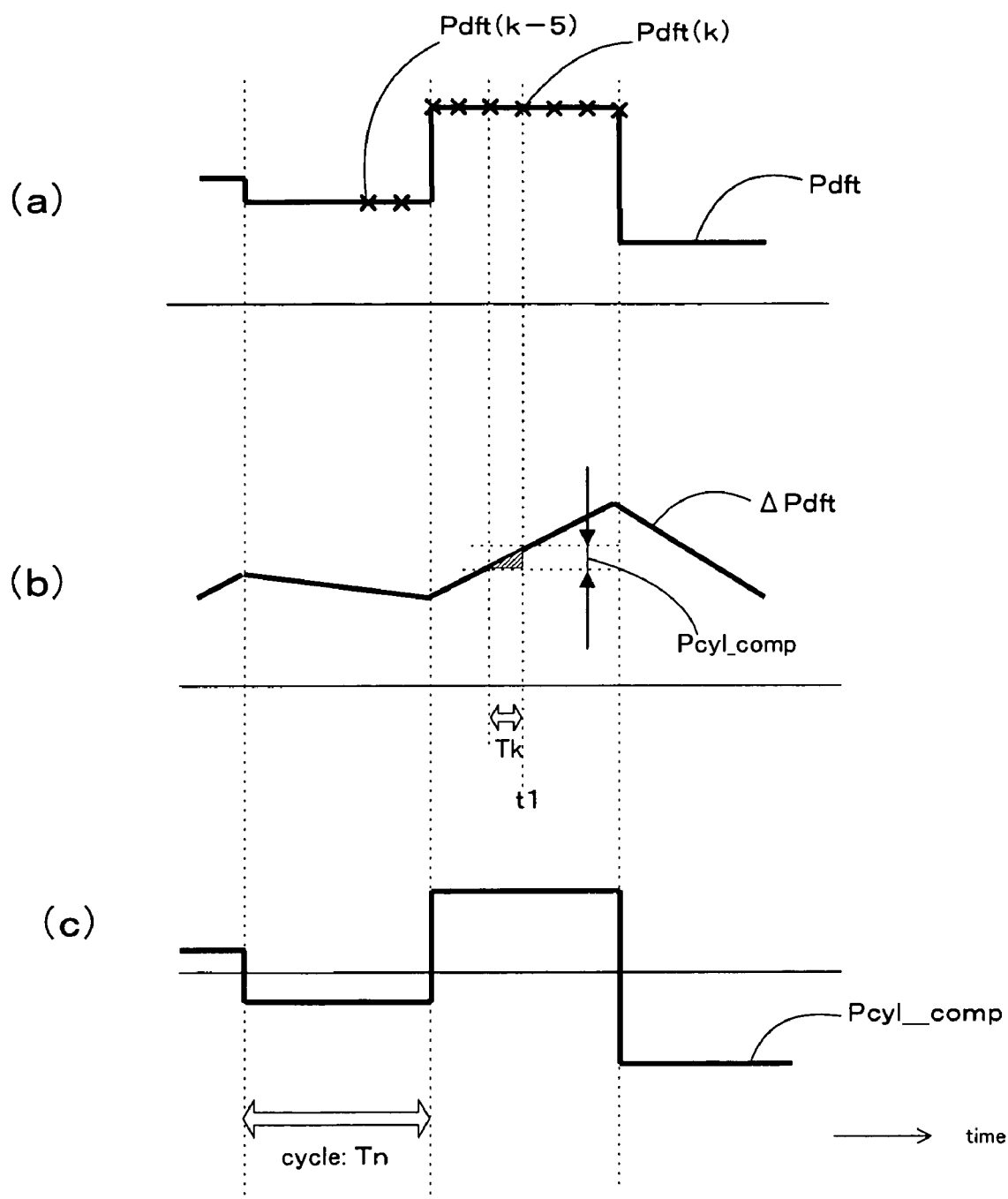
FIG. 27 A figure showing operation of another mechanism for calculating a drift correction amount in accordance with the seventh embodiment of the present invention.

FIG. 26 shows an alternative embodiment for the drift correction amount calculating unit 90 shown in FIG. 22. The sampling circuit 93 and the drift amount calculating circuit 94 are the same as shown in FIG. 22. This embodiment differs from the drift correction amount calculating unit shown in FIG. 22 in how to calculate the drift change rate Pcyl comp from the drift amount Pdft. According to this alternative embodiment, the drift change rate Pcyl_comp is calculated through a series of operations including oversampling, moving average and differentiation. These operations will be described referring to FIG. 27.

FIG. 27(a) shows a waveform of the drift amount Pdft calculated by the drift amount calculating circuit 94 in each combustion cycle (that is, in a cycle of Tn). An oversampling circuit 101 oversamples the drift amount Pdft in a cycle of Tk.

The number of times of sampling m in one combustion cycle is equal to "one combustion cycle/Tk". FIG. 27(a) shows a case of m=6.

Every time a sample value is obtained by the oversampling, a moving average circuit 102 calculates the average of samples Pdft(k−(m−1)) to Pdft(k) in accordance with the equation (10). Thus, the drift amount ΔPdft per Tk is calculated.

$$\Delta Pdft(k) = \frac{pdft(k-(m-1)) + Pdft(k-(m-2)) +, \ldots, +Pdft(k-1) + Pdft(k)}{m} \quad (10)$$

The drift amount ΔPdft thus calculated is expressed by a line shown in FIG. 27(b). The drift amount ΔPdft indicates the amount of drift accumulated per Tk. Accordingly, the drift change rate Pcyl_comp can be calculated by finding the gradient of the line shown in FIG. 27(b), or by differentiating the drift amount ΔPdft.

As an example, the drift change rate Pcyl_comp calculated at time t1 in the case of m=6 is illustrated. This drift change rate Pcyl_comp is calculated by differentiating ΔPdft that is obtained by moving-averaging Pdft(k−5) through Pdft(k). Thus, when the drift change rate Pcyl_comp is calculated in a cycle of Tk, a waveform as shown in FIG. 27(c) is obtained. The calculated drift change rate Pcyl_comp is fed back to the correction unit 91 (FIG. 22).

As described above, Tk is equal to the length of a cycle in which the output of the in-cylinder pressure sensor is converted from analog to digital. Thus, the output Vps of the in-cylinder pressure sensor determined in a cycle of Tk can be corrected with the drift change rate Pcyl_comp per Tk.

In this embodiment, the moving average is used in calculating the average of the oversampled values. Alternatively, another filtering technique (for example, low-pass filter) may be used.

Embodiment 8

Figure 28:
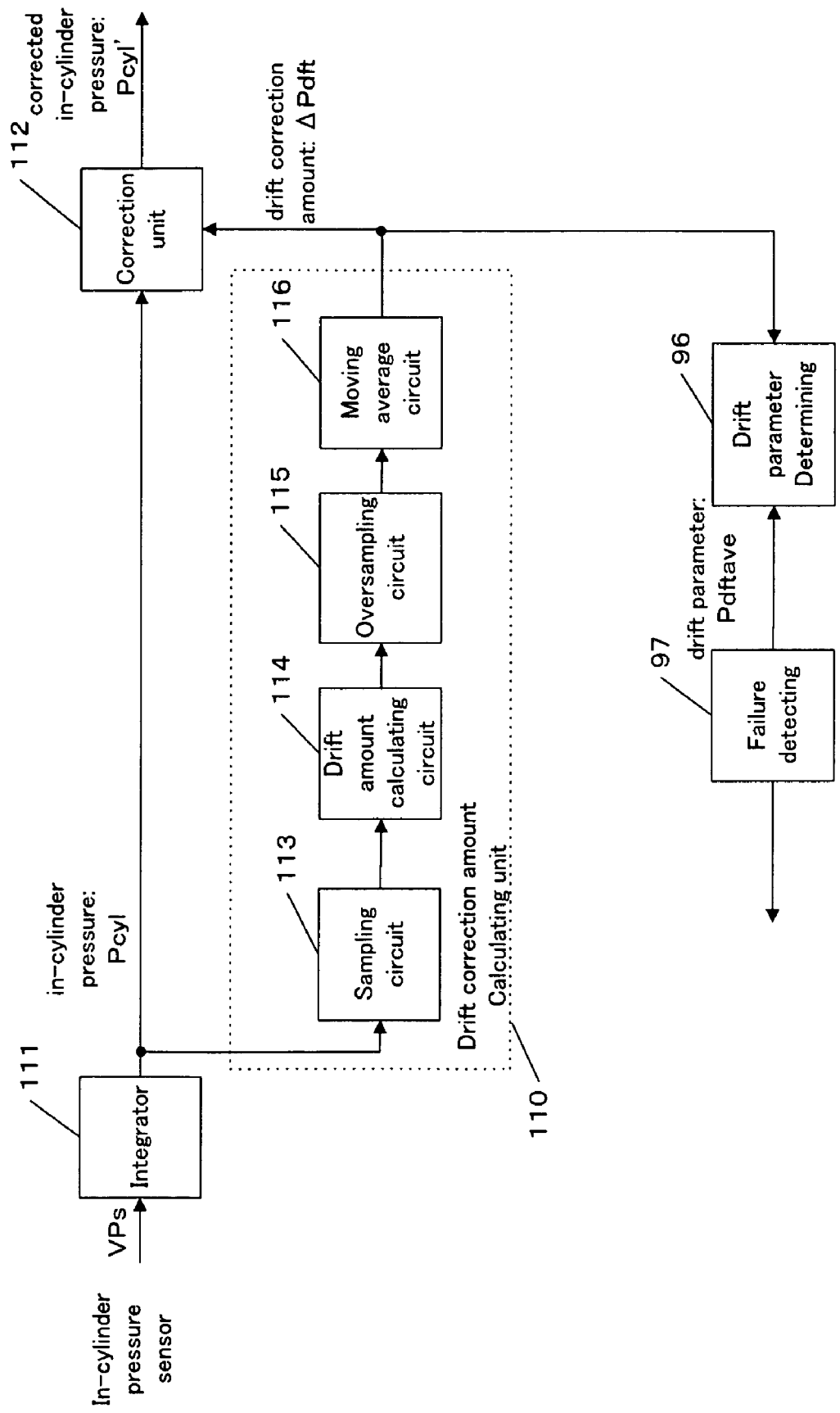
FIG. 28 A block diagram of an apparatus for determining a failure in accordance with an eighth embodiment of the present invention.

FIG. 28 is a block diagram of an apparatus for determining a failure of the in-cylinder pressure sensor in accordance with an eighth embodiment of the present invention. Similarly to the seventh embodiment, a mechanism for calculating the drift correction amount to obtain the in-cylinder pressure containing no drift is provided. This mechanism is used to calculate the drift parameter. The eighth embodiment differs from the seventh embodiment in how to calculate the drift correction amount.

An integrator 111 integrates the output Vps of the in-cylinder pressure sensor to calculate the in-cylinder pressure Pcyl. A correction unit 112 corrects the in-cylinder pressure Pcyl with the drift correction amount ΔPdft to calculate the corrected in-cylinder pressure Pcyl'. As a result of this correction, the corrected in-cylinder pressure Pcyl' contains no drift. A drift correction amount calculating unit 110 is a unit for calculating the drift correction amount ΔPdft based on the in-cylinder pressure Pcyl.

In this embodiment, the process by the drift correction amount calculating unit 110 is performed in a cycle of Tn that is equal to the length of one combustion cycle. The processes by the integrator 111 and the correction unit 112 are performed in a cycle of Tk that is shorter than Tn. Preferably, Tk is equal to the length of a cycle in which the output of the in-cylinder pressure sensor is converted from analog to digital. Thus, every time the output of the in-cylinder pressure sensor is obtained as a digital value Vps, the in-cylinder pressure Pcyl corresponding to Vps can be corrected with the drift correction amount ΔPdft.

A drift parameter determining unit 96 determines the drift parameter Pdftave based on the drift correction amount ΔPdft in a similar way to the seventh embodiment. A failure detecting unit 97 can detect a failure of the in-cylinder pressure sensor in accordance with any one of the first to fifth embodiments, as described above in the section of the sixth embodiment section.

The drift correction amount calculating unit 110 includes a sampling circuit 113, a drift amount calculating circuit 114, an oversampling circuit 115 and a moving average circuit 116. These circuits operate in a similar way to the sampling circuit 93, the drift amount calculating circuit 94, the oversampling circuit 101 and the moving average circuit 102 shown in FIG. 26 of the seventh embodiment. Thus, the drift amount ΔPdft per Tk is obtained from the moving average circuit 116 (see the equation (10)). A correction unit 112 receives the drift amount ΔPdft per Tk as the drift correction amount. The correction unit 112 corrects the in-cylinder pressure Pcyl by subtracting the drift correction amount ΔPdft from the in-cylinder pressure Pcyl to determine the corrected in-cylinder pressure Pcyl'. The corrected in-cylinder pressure Pcyl' represents the in-cylinder pressure containing no drift.

Thus, the in-cylinder pressure Pcyl is corrected with the drift correction amount ΔPdft every time the output of the in-cylinder pressure sensor is obtained as the digital value Vps. Because the length of Tk is shorter than the length of the combustion cycle, drift is prevented from accumulating in the in-cylinder pressure over one combustion cycle.

In this embodiment, the moving average is used for calculating the average of the oversampled values. Alternatively, another filtering technique (for example, low-pass filter) may be used.

Figure 29:
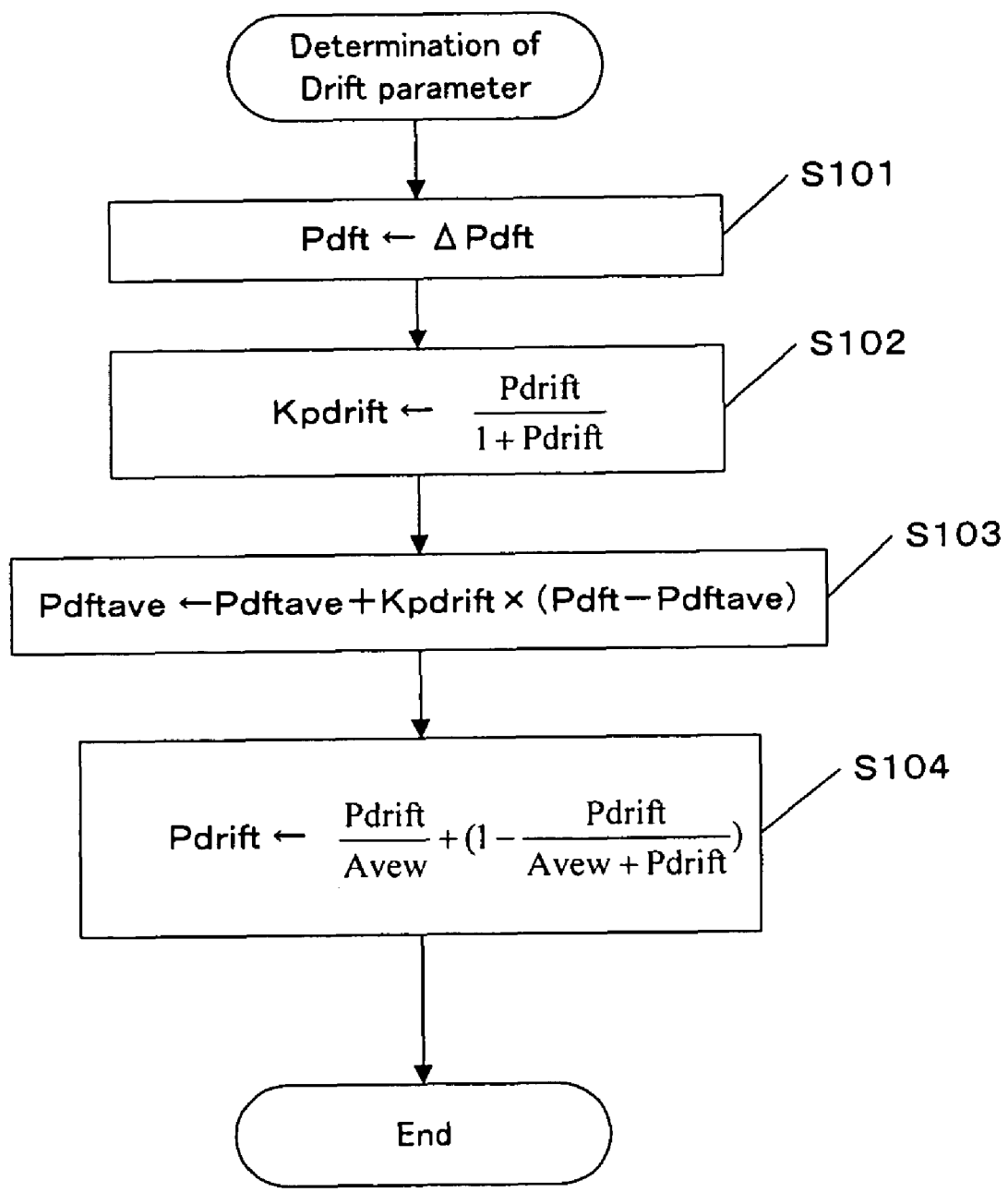
FIG. 29 A flowchart of a process for determining a drift parameter in accordance with the eighth embodiment of the present invention.

FIG. 29 is a flowchart of a process for determining the drift parameter in accordance with the eighth embodiment. In this example, the process is performed in a cycle of Tk. In step S101, the drift amount ΔPdft per Tk is set in the drift amount Pdft. Since steps S102 through step S104 are the same as step S14 through step S16 of FIG. 7, description about these steps is omitted.

As described above, a failure of the in-cylinder pressure sensor can be determined by applying the failure determination technique according to any one of the above-described first to fifth embodiments to the drift parameter thus determined.

The drift correction amount calculating mechanism shown in the seventh and eighth embodiments is only one example. Another mechanism may be used for correcting the output of the in-cylinder pressure sensor or correcting the in-cylinder pressure.

For example, a controller for performing a control that causes the drift change rate Pcyl_comp to converge to zero may be provided between the drift change rate calculating unit 95 and the correction unit 91 in the correction mechanism according to the seventh embodiment. In this case, a control input into the correction unit 91 is calculated such that the drift change rate Pcyl_comp converges to zero. By using the control input to correct the output Vps of the in-cylinder pressure sensor, it can be prevented that drift is contained in the output of the in-cylinder pressure sensor.

In the correction mechanism according to the eighth embodiment, a controller for performing a control that causes the drift amount ΔPdft to converge to zero may be provided between the moving average circuit 116 and the correction unit 112. In this case, an input into the drift correction amount calculating unit 110 is the corrected in-cylinder pressure Pcyl'. The drift correction amount ΔPdft is determined based on the corrected in-cylinder pressure Pcyl'. Then, a control for causing the drift correction amount ΔPdft to converge to zero is performed to calculate a control input into the correction unit 112. Since the correction unit 112 uses the control input to correct the in-cylinder pressure Pcyl, no drift is contained in the corrected in-cylinder pressure Pcyl'.

The present invention can be applied to a general-purpose engine (such as an outboard motor or the like).

The invention claimed is:

1. An apparatus for determining a failure of an in-cylinder pressure sensor mounted on an internal combustion engine, the apparatus comprising:
   in-cylinder pressure determining means for determining an in-cylinder pressure of the engine based on an output of the in-cylinder pressure sensor;
   means for determining a drift parameter based on the in-cylinder pressure, the drift parameter indicating an amount of drift included in the in-cylinder pressure; and
   a failure determining means for determining that the in-cylinder pressure sensor is faulty if the drift parameter is not within a predetermined range,
   in-cylinder pressure correcting means for correcting the in-cylinder pressure such that the in-cylinder pressure contains no drift,
   wherein the in-cylinder pressure correcting means further includes:
   correction means for correcting the output of the in-cylinder pressure sensor;
   integral means for integrating the output of the correction means to determine the in-cylinder pressure; and
   drift change rate calculating means for calculating a rate of change of drift contained in the in-cylinder pressure based on the in-cylinder pressure, and
   wherein the in-cylinder pressure correcting means feeds back the calculated drift change rate to the correction means, the correction means correcting the output of the in-cylinder pressure sensor with the drift change rate, and
   wherein the drift parameter determining means determines the drift parameter based on the drift change rate.

2. The apparatus of claim 1, further comprising means for setting the predetermined range based on a behavior of the in-cylinder pressure.

3. The apparatus of claim 1, further comprising means for manipulating the in-cylinder pressure sensor such that a predetermined signal is superimposed on the output of the in-cylinder pressure sensor,
   wherein the in-cylinder pressure determining means determines the in-cylinder pressure based on the output of the in-cylinder pressure sensor on which the predetermined signal has been superimposed.

4. An apparatus for determining a failure of an in-cylinder pressure sensor mounted on an internal combustion engine, the apparatus comprising:
   in-cylinder pressure determining means for determining an in-cylinder pressure of the engine based on an output of the in-cylinder pressure sensor;
   means for determining a drift parameter based on the in-cylinder pressure, the drift parameter indicating an amount of drift included in the in-cylinder pressure;
   means for determining a correction coefficient for correcting the drift parameter according to an operating condition of the engine; and
   means for correcting the drift parameter with the correction coefficient; and
   a failure determining means for determining that the in-cylinder pressure sensor is faulty if the corrected drift parameter is not within the predetermined range,
   in-cylinder pressure correcting means for correcting the in-cylinder pressure such that the in-cylinder pressure contains no drift,
   wherein the in-cylinder pressure correcting means further includes:
   correction means for correcting the output of the in-cylinder pressure sensor;
   integral means for integrating the output of the correction means to determine the in-cylinder pressure; and
   drift change rate calculating means for calculating a rate of change of drift contained in the in-cylinder pressure based on the in-cylinder pressure, and
   wherein the in-cylinder pressure correcting means feeds back the calculated drift change rate to the correction means, the correction means correcting the output of the in-cylinder pressure sensor with the drift change rate, and
   wherein the drift parameter determining means determines the drift parameter based on the drift change rate.

5. An apparatus for determining a failure of any of in-cylinder pressure sensors provided in respective cylinders of an internal combustion engine, comprising:
   in-cylinder pressure determining means for determining, for each of the cylinders, an in-cylinder pressure based on an output of the in-cylinder pressure sensor provided in the cylinder;
   drift parameter determining means for determining, for each of the cylinders, a drift parameter based on the in-cylinder pressure, the drift parameter indicating an amount of drift included in the in-cylinder pressure;
   correlation determining means for determining a correlation among the drift parameters for the cylinders; and
   failure determining means for determining whether any of the in-cylinder pressure sensors is faulty based on the correlation,
   in-cylinder pressure correcting means for correcting, for each of the cylinders, the in-cylinder pressure such that the in-cylinder pressure contains no drift, wherein the in-cylinder pressure correcting means further includes:

correction means for correcting the output of the in-cylinder pressure sensor;

integral means for integrating the output of the correction means to determine the in-cylinder pressure; and drift change rate calculating means for calculating a rate of change of drift contained in the in-cylinder pressure based on the in-cylinder pressure, and wherein the in-cylinder pressure correcting means feeds back the calculated drift change rate to the correction means, the correction means correcting the output of the in-cylinder pressure sensor with the drift change rate, and wherein the drift parameter determining means determines, for each of the cylinders, the drift parameter based on the drift change rate.

6. A method for determining a failure of an in-cylinder pressure sensor mounted on an internal combustion engine, comprising the steps of:

determining an in-cylinder pressure of the engine based on an output of the in-cylinder pressure sensor;

determining a drift parameter based on the in-cylinder pressure, the drift parameter indicating an amount of drift included in the in-cylinder pressure; and determining that the in-cylinder pressure sensor is faulty if the drift parameter is not within a predetermined range, correcting the in-cylinder pressure such that the in-cylinder pressure contains no drift, wherein the step of correcting the in-cylinder pressure further includes the steps of:

correcting the output of the in-cylinder pressure sensor;

integrating the output of the step of correcting the output of the in-cylinder pressure sensor to determine the in-cylinder pressure; and calculating a rate of change of drift contained in the in-cylinder pressure based on the in-cylinder pressure, and feed-backing the drift change rate to the step of correcting the output of the in-cylinder pressure sensor, wherein the step of correcting the output of the in-cylinder pressure sensor includes correcting the in-cylinder pressure with the drift change rate, and wherein the step of determining a drift parameter includes determining the drift parameter based on the drift change rate.

7. The method of claim 6, further comprising the step of setting the predetermined range based on a behavior of the in-cylinder pressure.

8. The method of claim 6, further comprising the step of manipulating the in-cylinder pressure sensor such that a predetermined signal is superimposed on the output of the in-cylinder pressure sensor, wherein the step for determining an in-cylinder pressure includes determining the in-cylinder pressure based on the output of the in-cylinder pressure sensor on which the predetermined signal has been superimposed.

9. A method for determining a failure of an in-cylinder pressure sensor mounted on an internal combustion engine, comprising the steps of:

determining an in-cylinder pressure of the engine based on an output of the in-cylinder pressure sensor;

determining a drift parameter based on the in-cylinder pressure, the drift parameter indicating an amount of drift included in the in-cylinder pressure; and determining a correction coefficient for correcting the drift parameter according to an operating condition of the engine;

correcting the drift parameter with the correction coefficient; and determining that the in-cylinder pressure sensor is faulty if the corrected drift parameter is not within the predetermined range, correcting the in-cylinder pressure such that the in-cylinder pressure contains no drift, wherein the step of correcting the in-cylinder pressure further includes the steps of:

correcting the output of the in-cylinder pressure sensor;

integrating the output of the step of correcting the output of the in-cylinder pressure sensor to determine the in-cylinder pressure; and calculating a rate of change of drift contained in the in-cylinder pressure based on the in-cylinder pressure, and feed-backing the drift change rate to the step of correcting the output of the in-cylinder pressure sensor, wherein the step of correcting the output of the in-cylinder pressure sensor includes correcting the in-cylinder pressure with the drift change rate, and wherein the step of determining a drift parameter includes determining the drift parameter based on the drift change rate.

10. A method for determining a failure of any of cylinder pressure sensors provided in respective cylinders of an internal combustion engine, comprising the steps of:

determining, for each of the cylinders, an in-cylinder pressure based on an output of the in-cylinder pressure sensor provided in the cylinder;

determining, for each of the cylinders, a drift parameter based on the in-cylinder pressure, the drift parameter indicating an amount of drift included in the in-cylinder pressure;

determining a correlation among the drift parameters for the cylinders; and determining whether any of the in-cylinder pressure sensors is faulty based on the correlation, correcting, for each of the cylinders, the in-cylinder pressure such that the in-cylinder pressure contains no drift, wherein the step of correcting the in-cylinder pressure further includes the steps of:

correcting the output of the in-cylinder pressure sensor;

integrating the output of the step of correcting the output of the in-cylinder pressure sensor to determine the in-cylinder pressure; and calculating a rate of change of drift contained in the in-cylinder pressure based on the in-cylinder pressure, and feed-backing the drift change rate to the step of correcting the output of the in-cylinder pressure sensor, wherein the step of correcting the output of the in-cylinder pressure sensor includes correcting the in-cylinder pressure with the drift change rate, and wherein the step of determining a drift parameter includes determining, for each of the cylinders, the drift parameter based on the drift change rate.

* * * * *